(12) United States Patent
Arita et al.

(10) Patent No.: US 12,076,898 B2
(45) Date of Patent: Sep. 3, 2024

(54) INJECTION MOLDING MACHINE SYSTEM AND INJECTION MOLDING MACHINE

(71) Applicant: SUMITOMO HEAVY INDUSTRIES, LTD., Tokyo (JP)

(72) Inventors: Mikio Arita, Kanagawa (JP); Hiroshi Mogi, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 15 days.

(21) Appl. No.: 17/817,764

(22) Filed: Aug. 5, 2022

(65) Prior Publication Data

US 2022/0371246 A1 Nov. 24, 2022

Related U.S. Application Data

(63) Continuation of application No. PCT/JP2021/004988, filed on Feb. 10, 2021.

(30) Foreign Application Priority Data

Feb. 14, 2020 (JP) ................. 2020-023776

(51) Int. Cl.
*B29C 45/76* (2006.01)
*B29C 45/03* (2006.01)
*G06F 8/65* (2018.01)

(52) U.S. Cl.
CPC ............. *B29C 45/76* (2013.01); *G06F 8/65* (2013.01); *B29C 45/03* (2013.01)

(58) Field of Classification Search
CPC .................. B29C 45/76; G06F 8/65
See application file for complete search history.

(56) References Cited

U.S. PATENT DOCUMENTS 6,678,741 B1 * 1/2004 Northcutt ................. G06F 8/65
709/203
11,194,564 B1 * 12/2021 Dwivedi ................ H04L 67/10
(Continued)

FOREIGN PATENT DOCUMENTS

JP 2001027940 A * 1/2001 ........... G06F 3/1204
JP 4005922 11/2007
(Continued)

OTHER PUBLICATIONS

Translation of JP 2001-27940 (Year: 2001).*
(Continued)

*Primary Examiner* — John J DeRusso
(74) *Attorney, Agent, or Firm* — IPUSA, PLLC

(57) ABSTRACT

An injection molding machine managing system includes a managing device, and an injection molding machine communicably connected with the device and performing at least one of the following: send data to the device; and receive data from the device. Upon a version mismatch between these device and machine, the system performs at least one of the following: send a notification about the mismatch to a user; and perform a process for removing the mismatch. An injection molding machine includes a control device, and a driver communicably connected with the device and performing at least one of the following: send data to the device; and receive data from the device. Upon a version mismatch between these device and driver, the machine performs at least one of the following: send a notification about the mismatch to a user; and perform a process for removing the mismatch.

9 Claims, 14 Drawing Sheets

(56) References Cited

U.S. PATENT DOCUMENTS

| | | | | |
|---|---|---|---|---|
| 2003/0014470 A1* | 1/2003 | Iijima | ................ | G06F 8/65 |
| | | | | 718/106 |
| 2003/0110009 A1 | 6/2003 | Fujita | | |
| 2003/0142351 A1* | 7/2003 | Sakura | ................ | G06F 8/65 |
| | | | | 358/1.15 |
| 2019/0278588 A1* | 9/2019 | Miyake | ............ | B60R 16/023 |
| 2021/0240461 A1* | 8/2021 | Rajagopalan | ........ | H04L 67/34 |
| 2022/0148344 A1* | 5/2022 | Teraoka | ............ | G09C 1/00 |

FOREIGN PATENT DOCUMENTS

| | | |
|---|---|---|
| JP | 2015-125512 | 7/2015 |
| JP | 2017-105136 | 6/2017 |
| JP | 2019-177523 | 10/2019 |
| KR | 1020170108504 | 9/2017 |

OTHER PUBLICATIONS

Translation of KR 10-2017-0108504 (Year: 2017).*
International Search Report for PCT/JP2021/004988 mailed on Apr. 13, 2021.

* cited by examiner

| CONTROLLER'S VERSION | | |
|---|---|---|
| ADAPTABLE VERSION | HIGHEST VERSION | LOWEST VERSION |
| DRIVER | | |
| ENCODER | | |

FIG.5

| CONTROLLER'S VERSION | 1.0 | |
|---|---|---|

| ADAPTABLE VERSION | HIGHEST VERSION | LOWEST VERSION |
|---|---|---|
| DRIVER | 1.0 | 1.0 |
| ENCODER | 1.0 | 1.0 |

FIG.6

| CONTROLLER'S VERSION | 1.1 | |
|---|---|---|

| ADAPTABLE VERSION | HIGHEST VERSION | LOWEST VERSION |
|---|---|---|
| DRIVER | 1.0 | 1.0 |
| ENCODER | 1.0 | 1.0 |

FIG.7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| DATA 1 | SPEED COMMAND VALUE |||||||||||||||||||||||||||||||||
| DATA 2 | TORQUE LIMIT VALUE (HIGHEST VALUE) |||||||||||||||||||||||||||||||||
| DATA 3 | TORQUE LIMIT VALUE (LOWEST VALUE) |||||||||||||||||||||||||||||||||

FIG.8

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|----|----|----|----|----|----|----|----|----|----|----|----|----|----|----|----|----|----|----|----|----|----|
| DATA 1 | SPEED COMMAND VALUE ||||||||||||||||||||||||||||||||
| DATA 2 | TORQUE FF COMMAND VALUE ||||||||||||||||||||||||||||||||
| DATA 3 | TORQUE LIMIT VALUE (HIGHEST VALUE) |||||||||||||||| | TORQUE LIMIT VALUE (LOWEST VALUE) ||||||||||||||||

FIG.9

| CONTROLLER'S VERSION | 2.0 | |
|---|---|---|

| ADAPTABLE VERSION | HIGHEST VERSION | LOWEST VERSION |
|---|---|---|
| DRIVER | 2.0 | 2.0 |
| ENCODER | 1.0 | 1.0 |

FIG.10

| CONTROLLER'S VERSION | 2.1 | |
|---|---|---|

| ADAPTABLE VERSION | HIGHEST VERSION | LOWEST VERSION |
|---|---|---|
| DRIVER | 3.0 | 2.0 |
| ENCODER | 1.0 | 1.0 |

FIG.11

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| DATA 1 | ONE-ROTATION POSITION DATA ||||||||||||||||||||||||||||||||
| DATA 2 | STATUS ||||||||||||||||||||||||||||||||
| DATA 3 | ⟨NOT IN USE⟩ ||||||||||||||||||||||||||||||||

FIG.12

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| DATA 1 | MULTI-ROTATION POSITION DATA ||||||||||||||||||||||||||||||||
| DATA 2 | ONE-ROTATION POSITION DATA ||||||||||||||||||||||||||||||||
| DATA 3 | STATUS ||||||||||||||||||||||||||||||||

FIG.13

| CONTROLLER'S VERSION | 3.0 |
|---|---|

| ADAPTABLE VERSION | HIGHEST VERSION | LOWEST VERSION |
|---|---|---|
| DRIVER | 3.0 | 2.0 |
| ENCODER | 2.0 | 2.0 |

FIG.15

| MANAGING DEVICE'S VERSION | 1.0 | |
|---|---|---|
| ADAPTABLE VERSION | HIGHEST VERSION | LOWEST VERSION |
| INJECTION MOLDING MACHINE (CONTROL DEVICE) | 1.0 | 1.0 |

FIG.16

| MANAGING DEVICE'S VERSION | 1.1 | |
|---|---|---|
| ADAPTABLE VERSION | HIGHEST VERSION | LOWEST VERSION |
| INJECTION MOLDING MACHINE (CONTROL DEVICE) | 1.0 | 1.0 |

FIG.17

| MANAGING DEVICE'S VERSION | 1.0 | |
|---|---|---|
| ADAPTABLE VERSION | HIGHEST VERSION | LOWEST VERSION |
| INJECTION MOLDING MACHINE (CONTROL DEVICE) | 1.1 | 1.0 |

FIG.18

| MANAGING DEVICE'S VERSION | 2.0 | |
|---|---|---|
| ADAPTABLE VERSION | HIGHEST VERSION | LOWEST VERSION |
| INJECTION MOLDING MACHINE (CONTROL DEVICE) | 2.0 | 2.0 |

FIG.19

| MASTER MACHINE'S (CONTROL DEVICE'S) VERSION | 1.0 | |
|---|---|---|
| ADAPTABLE VERSION | HIGHEST VERSION | LOWEST VERSION |
| SLAVE MACHINE (CONTROL DEVICE) | 1.0 | 1.0 |

FIG.20

| MASTER MACHINE'S (CONTROL DEVICE'S) VERSION | 1.1 | |
|---|---|---|
| ADAPTABLE VERSION | HIGHEST VERSION | LOWEST VERSION |
| SLAVE MACHINE (CONTROL DEVICE) | 1.1 | 1.0 |

FIG.21

| MASTER MACHINE'S (CONTROL DEVICE'S) VERSION | 1.0 | |
|---|---|---|

| ADAPTABLE VERSION | HIGHEST VERSION | LOWEST VERSION |
|---|---|---|
| SLAVE MACHINE (CONTROL DEVICE) | 1.1 | 1.0 |

FIG.22

| MASTER MACHINE'S (CONTROL DEVICE'S) VERSION | 2.0 | |
|---|---|---|

| ADAPTABLE VERSION | HIGHEST VERSION | LOWEST VERSION |
|---|---|---|
| SLAVE MACHINE (CONTROL DEVICE) | 2.0 | 2.0 |

INJECTION MOLDING MACHINE SYSTEM AND INJECTION MOLDING MACHINE

RELATED APPLICATIONS

This application is a continuation application filed under 35 U.S.C. 111(a) claiming benefit under U.S.C. 120 and 365(c) of PCT International Application No. PCT/JP2021/004988, filed on Feb. 10, 2021, and designating the U.S., which claims priority to Japanese Patent Application No. 2020-023776, filed on Feb. 14, 2020. The entire contents of the foregoing applications are incorporated herein by reference.

BACKGROUND

Technical Field

This disclosure relates to, for example, an injection molding machine system.

Description of Related Art

For example, data might be exchanged between an injection molding machine and an external device (for example, a managing device that manages the injection molding machine, another injection molding machine (also in this field of technology referred to as a "master") that externally controls the injection molding machine (also in this field of technology referred to as a "slave"), etc.).

In this case, for example, the injection molding machine can be operated under the control of the external device, by using data received from the injection molding machine. Also, for example, data analysis such as a diagnosis of the injection molding machine can be performed by using data received from the injection molding machine.

Also, for example, there might be cases where data is exchanged between a control device inside an injection molding machine and a peripheral device (for example, a driver that drives an electric actuator, a sensor that detects the operation of the electric actuator, etc.).

In this case, for example, it is possible to control the electric actuator and operate the injection molding machine under the control of the control device, by using data received from the peripheral device. Also, for example, data analysis such as a diagnosis of the injection molding machine can be performed by using data received from the peripheral device.

SUMMARY

One embodiment of this disclosure provides an injection molding machine system. This injection molding machine system has a predetermined device; and a first injection molding machine that is communicably connected with the predetermined device and configured to perform at least one of the following: send data to the predetermined device; and receive data from the predetermined device. When there is a version mismatch between the predetermined device and the first injection molding machine, the injection molding machine system performs at least one of the following: send a notification about the version mismatch to a user; and perform a process for removing the version mismatch.

Also, another embodiment of this disclosure provides an injection molding machine. This injection molding machine has a first device; and a second device that is communicably connected with the first device and configured to perform at least one of the following: send data to the first device; and receive data from the first device. When there is a version mismatch between the first device and the second device, the injection molding machine performs at least one of the following: send a notification about the version mismatch to a user; and perform a process for removing the version mismatch.

BRIEF DESCRIPTION OF THE DRAWINGS

FIG. 5 is a diagram showing a first set of examples of specific elements of the adaptable version table of the control device;

FIG. 6 is a diagram showing a second set of examples of specific elements of the adaptable version table of the control device;

FIG. 7 is a diagram showing an example of control data sent from the control device to the driver;

FIG. 8 is a diagram showing another example of control data sent from the control device to the driver;

FIG. 9 is a diagram showing a third set of examples of specific elements of the adaptable version table of the control device;

FIG. 10 is a diagram showing a fourth set of examples of specific elements of the adaptable version table of the control device;

FIG. 11 is a diagram showing an example of detection data sent from the encoder to the control device;

FIG. 12 is a diagram showing another example of detection data sent from the encoder to the control device;

FIG. 13 is a diagram showing a fifth set of examples of specific elements of the adaptable version table of the control device;

FIG. 15 is a diagram showing a first set of examples of specific elements of table information (adaptable version table) related to the versions of an injection molding machine (control device) with which a managing device can ensure data compatibility;

FIG. 16 is a diagram showing a second set of examples of specific elements of the adaptable version table of the managing device;

FIG. 17 is a diagram showing a third set of examples of specific elements of the adaptable version table of the managing device;

FIG. 18 is a diagram showing a fourth set of examples of specific elements of the adaptable version table of the managing device;

FIG. 19 shows the first set of examples of specific elements of table information (adaptable version table) related to the versions of a slave machine (control device) with which a master machine (control device) can ensure data compatibility;

FIG. 20 is a diagram showing a second set of examples of specific elements of the adaptable version table of the master machine;

FIG. 21 is a diagram showing a third set of examples of specific elements of the adaptable version table of the master machine; and FIG. 22 is a diagram showing a fourth set of examples of specific elements of the adaptable version table of the master machine.

DETAILED DESCRIPTION

A version mismatch might occur, for example, between the two devices that exchange data with each other. If, for example, one of the devices is replaced or initialized due to a failure or the like, its data might cease to be of the latest version, and a version mismatch might occur between the two devices. Therefore, data compatibility might not be ensured between the two devices exchanging data, and it might not be possible to carry out proper control in relation to the injection molding machine, make its diagnosis properly, and so forth, based on the data exchanged thus. As a result of this, for example, malfunctions occur due to improper control, or failures and the like are not identified properly, and this might make it difficult to ensure proper operation of the injection molding machine.

In view of the foregoing, it is desirable to provide a technique that enables an injection molding machine to operate more properly.

Now, embodiments of the present disclosure will be described below with reference to the accompanying drawings.

[Configuration of Injection Molding Machine Managing System]

First, the configuration of an injection molding machine managing system (hereinafter simply "managing system") SYS according to this embodiment (an example of an injection molding machine system) will be described below with reference to FIG. 1 and FIG. 2.

Figure 1:
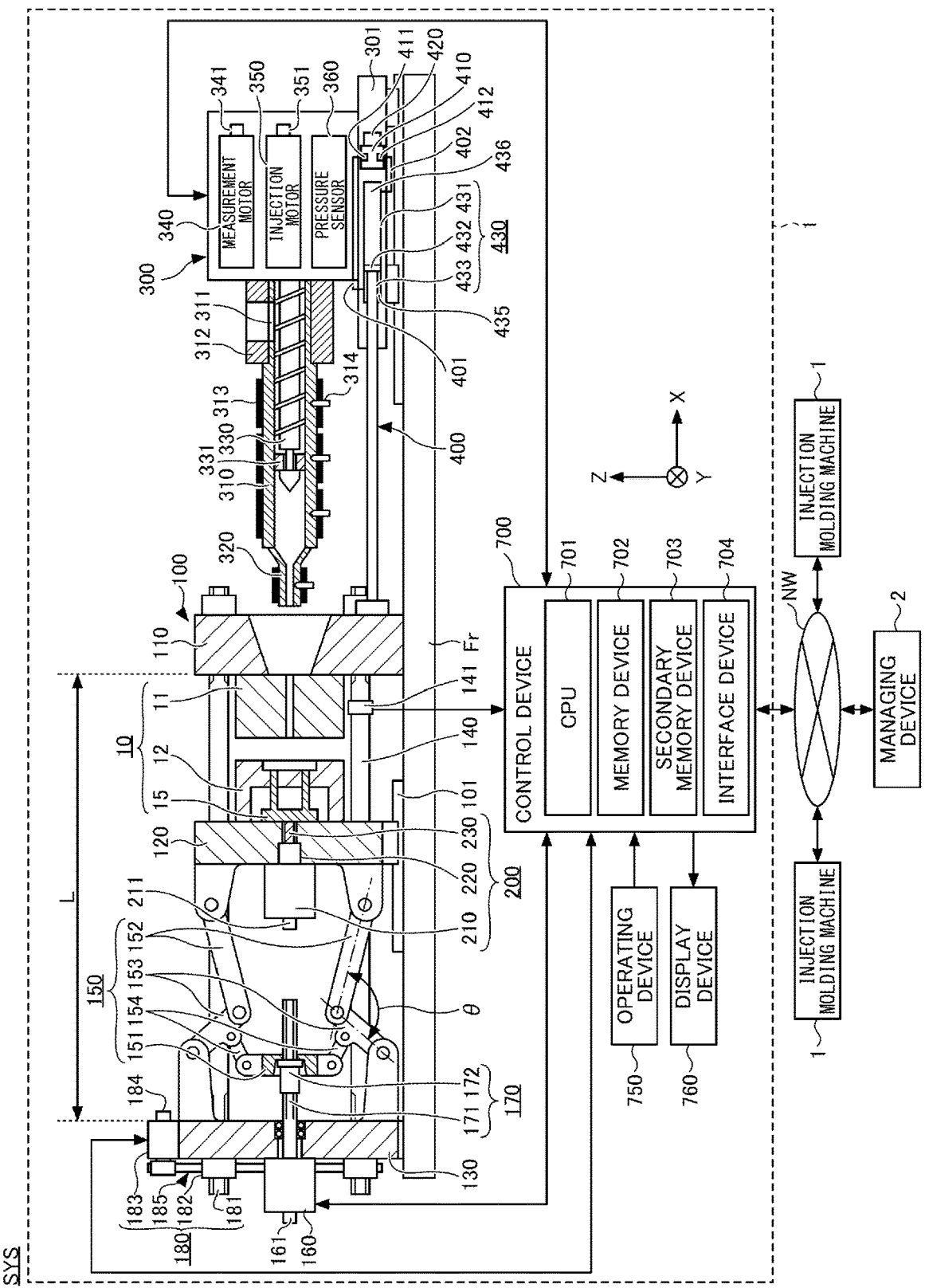
FIG. 1 is a diagram showing an example configuration of an injection molding machine managing system including an injection molding machine.
Figure 2:
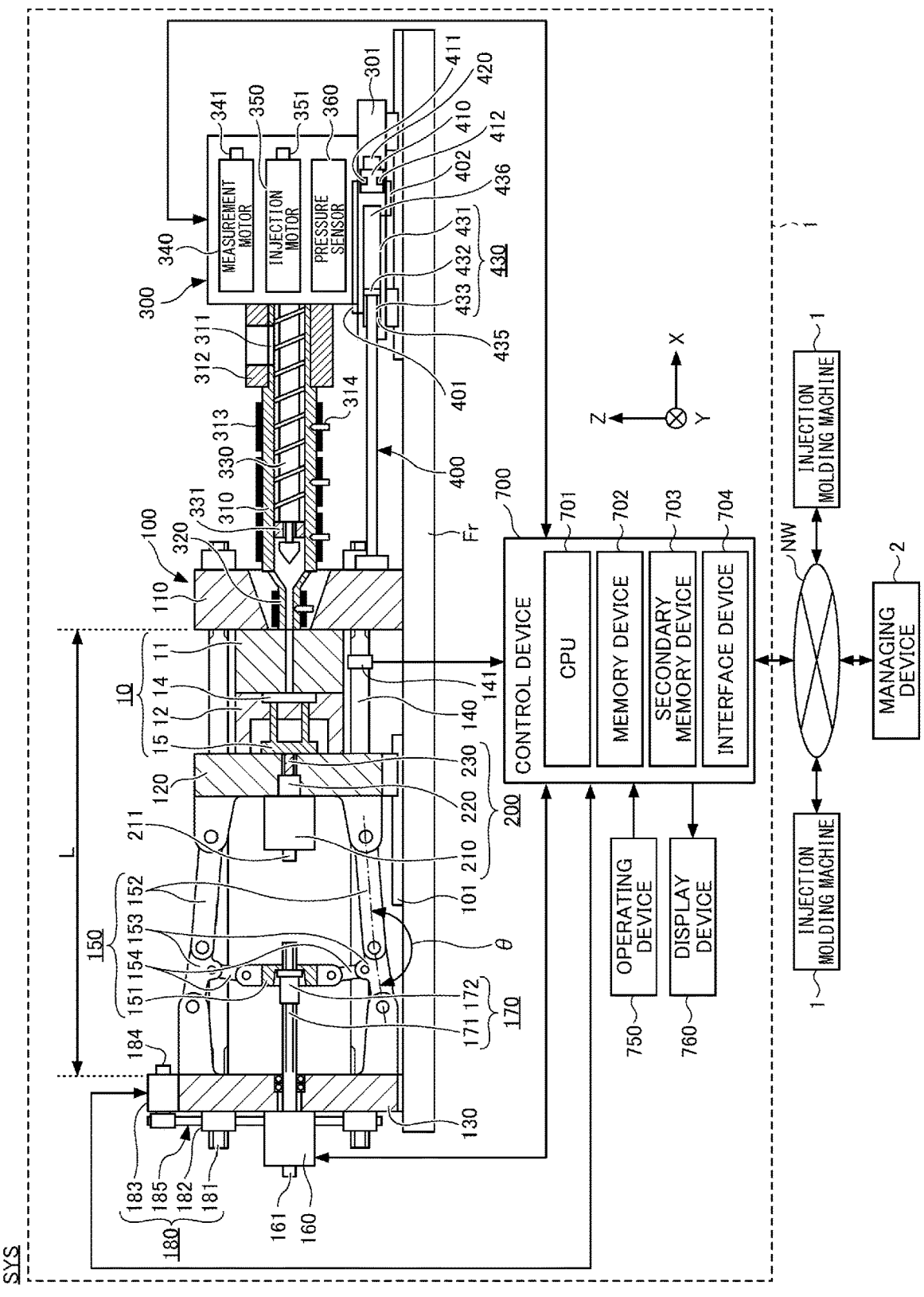
FIG. 2 is a diagram showing another example configuration of the injection molding machine managing system including the injection molding machine.

FIG. 1 and FIG. 2 are diagrams, each showing an example of the managing system SYS according to this embodiment. To be more specific, FIG. 1 is a cross-sectional side view showing a state in which the mold of an injection molding machine 1 is fully open, and FIG. 2 is a cross-sectional side view showing a state in which the mold of the injection molding machine 1 is clamped. Below, in the drawings of this embodiment, the X-axis, the Y-axis, and the Z-axis are perpendicular to each other. The positive and negative directions on the X-axis (hereinafter simply "X directions") and the positive and negative directions on the Y-axis (hereinafter simply "Y directions") represent horizontal directions. The positive and negative directions on the Z axis (hereinafter simply "Z direction") represent vertical directions.

The managing system SYS includes a plurality of (three in this example) injection molding machines 1, and a managing device 2.

Note that the number of injection molding machines 1 included in the managing system SYS may be one or two, or four or more.

<Configuration of Injection Molding Machine>

The injection molding machine 1 performs a series of operations for having molded products.

Also, the injection molding machine 1 is communicably connected with a managing device 2 through a predetermined communication network NW. Also, the injection molding machine 1 may be communicably connected with another injection molding machine 1 through the communication network NW. The communication network NW includes, for example, a local network (LAN: Local Area Network) in a factory where the injection molding machine 1 is installed. The local network may be wired, wireless, or both. Also, the communication network NW may include, for example, a wide area network (WAN) outside the factory where the injection molding machine 1 is installed. The wide area network may include, for example, a mobile communication network having a base station as an end. The mobile communication network may support, for example, 4G (4th Generation) including LTE (Long Term Evolution), 5G (5th Generation), and so forth. Also, the wide area network may include, for example, a satellite communication network that uses communication satellites. Also, the wide area network may include, for example, the Internet. Also, the communication network NW may be, for example, a short-range wireless communication network that supports Bluetooth (registered trademark) communication, Wi-Fi communication, and so on.

For example, the injection molding machine 1 sends (uploads) data related to the operating status of the injection molding machine 1 (hereinafter referred to as "operating status data"), to the managing device 2, through the communication network NW. This allows the managing device 2 (or its administrator, worker, etc.) to learn about the operating status of the injection molding machine 1, and manage the timing of maintenance for the injection molding machine 1, the schedule of operation of the injection molding machine 1, and so forth. Also, the managing device 2 can generate data related to the control of the injection molding machine 1 (for example, molding conditions) based on operating status data of the injection molding machine 1, and send it to the injection molding machine 1, thus controlling the injection molding machine 1 from outside.

Also, for example, the injection molding machine may serve as a master machine, and monitor or control the operation of another injection molding machine 1 that serves as a slave machine, through the communication network NW. To be more specific, the injection molding machine 1 (slave machine) may send operating status data to the injection molding machine 1 (master machine) through the communication network NW. This allows the injection molding machine (master machine) to monitor the operation of the other injection molding machine 1 (slave machine). Also, while so learning about the operating status of the other injection molding machine 1 (slave machine) based on the operating status data, the injection molding machine 1 (master machine) may also send operation-related control commands to the other injection molding machine 1 (slave machine) through the communication network NW. This allows the injection molding machine 1 (master machine) to control the operation of the other injection molding machine 1 (slave machine).

The injection molding machine 1 includes a clamping device 100, an ejector device 200, an injection device 300, a move device 400, and a control device 700.

<<Clamping Device>>

The clamping device 100 closes, clamps, and opens the mold of the mold device 10. The clamping device 100 is, for example, horizontal, and the mold opens and closes horizontally. The clamping device 100 has a fixed platen 110, a movable platen 120, a toggle support 130, a tie bar 140, a toggle mechanism 150, a clamping motor 160, a motion conversion mechanism 170, and a mold-thickness adjusting mechanism 180.

In the following description of the clamping device 100, the direction in which the movable platen 120 moves when the mold closes (the right in FIG. 1 and FIG. 2) is the front, and the direction in which the movable platen 120 moves when the mold opens (the left in FIG. 1 and FIG. 2) is the rear.

The fixed platen 110 is fixed to a frame Fr. A fixed mold 11 is attached to the surface of the fixed platen 110 facing the movable platen 120.

The movable platen 120 is free to move, with respect to the frame Fr, in the directions in which the mold opens and closes. A guide 101 for guiding the movable platen 120 is laid on the frame Fr. A movable mold 12 is attached to the surface of the movable platen 120 facing the fixed platen 110.

As the movable platen 120 moves forward or backward with respect to the fixed platen 110, the mold is closed, clamped, and opened.

The mold device 10 includes a fixed mold 11 corresponding to the fixed platen 110, and a movable mold 12 corresponding to the movable platen 120.

The toggle support 130 is connected with the fixed platen 110 at a predetermined distance L, and placed on the frame Fr such that the toggle support is free to move in the directions in which the mold opens and closes. The toggle support 130 may be free to move, for example, along a guide that is laid on the frame Fr. In this case, the guide for the toggle support 130 may be the same as the guide 101 for the movable platen 120.

Note that, although the fixed platen 110 is fixed to the frame Fr and the toggle support 130 is free to move with respect to the frame Fr in the directions in which the mold opens and closes, it is equally possible to fix the toggle support 130 to the frame Fr and allow the fixed platen 110 to move freely with respect to the frame Fr in the directions in which the mold opens and closes.

The tie bar 140 connects the fixed platen 110 and the toggle support 130 at a distance L in the directions in which the mold opens and closes. A plurality of tie bars 140 (for example, four tie bars) may be used. Each tie bar 140 is parallel to the directions in which the mold opens and closes, and extends in accordance with the clamping force. At least one tie bar 140 is provided with a tie bar strain sensor 141 that detects the strain of the tie bar 140. The tie bar strain sensor 141 is, for example, a strain gauge. The tie bar strain sensor 141 sends a signal indicating its detection result to the control device 700. The detection result of the tie bar strain sensor 141 is used, for example, to detect the clamping force.

Note that, instead of or in addition to the tie bar strain sensor 141, any unspecified clamping force sensors available for detecting the clamping force may be used. For example, the clamping force sensor is not limited to being a strain gauge type, and may be a piezoelectric type, a capacitive type, an oil-type, an electromagnetic type, and so on, and its mounting position is not limited to the tie bar 140 either.

The toggle mechanism 150 is provided between the movable platen 120 and the toggle support 130, and moves the movable platen 120 with respect to the toggle support 130, in the directions in which the mold opens and closes. The toggle mechanism 150 is composed of a crosshead 151, a pair of link sets, and so forth. Each set of links include first links 152 and second links 153 that are connected flexibly by pins or the like. The first links 152 are swingably attached to the movable platen 120 with pins or the like. The second links 153 are swingably attached to the toggle support 130 with pins or the like. The second links 153 are attached to the crosshead 151 via third links 154. When the crosshead 151 is moved forward or backward with respect to the toggle support 130, the first links 152 and the second links 153 bend and stretch, and the movable platen 120 moves forward or backward with respect to the toggle support 130.

Note that the configuration of the toggle mechanism 150 is not limited to the configurations shown in FIG. 1 and FIG. 2. For example, in FIG. 1 and FIG. 2, the number of nodes in each set of links is 5, but this can be 4, and, furthermore, one end part of each third link 154 may be connected to a node between the first links 152 and the second links 153.

A clamping motor 160 is attached to the toggle support 130 to activate the toggle mechanism 150. The clamping motor 160 moves the crosshead 151 forward or backward with respect to the toggle support 130, thereby making the first links 152 and the second links 153 bend and stretch, and moving movable platen 120 forward or backward with respect to the toggle support 130. The clamping motor 160 is directly connected to the motion conversion mechanism 170, but may be connected to the motion conversion mechanism 170 via a belt, a pulley and the like.

The motion conversion mechanism 170 converts the rotational motion of the clamping motor 160 into linear motion of the crosshead 151. The motion conversion mechanism 170 includes a screw shaft 171, and a screw nut 172 that is screwed into the screw shaft 171. A ball or a roller may be interposed between the screw shaft 171 and the screw nut 172.

The clamping device 100 performs a mold-closing step, a mold-clamping step, a mold-opening step, and the like, under the control of the control device 700.

In the mold-closing step, the clamping motor 160 is driven to move the crosshead 151 forward at a set speed, to the position where the mold is closed completely, thereby moving the movable platen 120 forward and making the movable mold 12 touch the fixed mold 11. The position and speed of the crosshead 151 are detected by using, for example, a clamping motor encoder 161 or the like. The clamping motor encoder 161 detects the rotation of the clamping motor 160, and sends a signal indicating the detection result to the control device 700.

Note that, as for a crosshead position sensor for detecting the position of the crosshead 151 and a crosshead speed sensor for detecting the speed of the crosshead 151, these are by no means limited to the clamping motor encoder 161, and more general ones can be used. Also, as for a movable platen position sensor for detecting the position of the movable platen 120 and a movable platen speed sensor for detecting the speed of the movable platen 120, these are by no means limited to the clamping motor encoder 161, and more general ones can be used.

In the mold-clamping step, the clamping motor 160 is driven more to move the crosshead 151 forward farther from the position where the mold is closed completely, to the clamping position, thereby generating a clamping force. When the mold is clamped, a cavity space 14 is formed between the movable mold and the fixed mold 11, and the injection device 300 fills this cavity space 14 with a liquid molding material. A molded product is gained as the filled molding material solidifies. A plurality of cavity spaces 14 may be provided. In that case, a plurality of molded products can be gained at a time.

In the mold-opening step, the clamping motor 160 is driven to move the crosshead 151 backward at a set speed, to the position where the mold is fully open, thereby moving the movable platen 120 backward and separating the movable mold 12 from the fixed mold 11. Afterwards, the ejector device 200 ejects the molded product from the movable mold 12.

The setting conditions in the mold-closing step and the mold-clamping step are set up collectively as a series of setting conditions. For example, the speeds and positions of the crosshead 151 in the mold-closing step and the mold-clamping step (including the position where the mold starts closing, the position where the speed is switched, the position where the mold is closed completely, and the clamping position), the clamping force, and the like are set up collectively as a series of setting conditions. The position where the mold starts closing, the position where the speed is switched, the position where the mold is closed completely, and the clamping position are arranged in this order, from the rear to the front, and represent the starting points and the end points of periods where the speed is set. The speed is set for each section. There may be one or more positions where the speed is switched. The position to switch the speed does not have to be set. Only one of the clamping position and the clamping force may be set.

Also, the setting conditions in the mold-opening step are set in the same manner. For example, the speeds and positions of the crosshead 151 in the mold-opening step (including the position where the mold starts opening, the position where the speed is switched, and the position where the mold is fully open) are set up collectively as a series of setting conditions. The position where the mold starts opening, the position where the speed is switched, and the position where the mold is fully open are arranged in this order, from the front to the rear, and represent the starting points and the end points of sections where the speed is set. The speed is set for each section. There may be one or more positions where the speed is switched. The position for switching the speed does not have to be set. The position where the mold starts opening and the clamping position may be the same. Also, the position where the mold is fully open and the position where the mold starts closing may be the same.

Note that the speed, position, and so forth of the movable platen 120 may be set instead of the speed, position, and so forth of the crosshead 151. Also, clamping force may be set, instead of the position of the crosshead (for example, the clamping position) or the position of the movable platen.

The toggle mechanism 150 amplifies the driving force of the clamping motor 160 and sends it to the movable platen 120. The rate of magnification here is also referred to as "toggle magnification." The toggle magnification changes according to an angle θ that is formed between the first link 152 and the second link 153 (hereinafter referred to as "link angle"). Link angle θ can be determined from the position of the crosshead 151. When link angle θ is 180 degrees, the toggle magnification becomes the largest.

When the thickness of the mold device 10 changes due to replacement of the mold device 10 or a change in the temperature of the mold device 10, the thickness of the mold is adjusted so that a predetermined clamping force can be gained when the mold is clamped. In adjusting the thickness of the mold, for example, the distance L between the fixed platen 110 and the toggle support 130 is adjusted so that link angle θ in the toggle mechanism 150 becomes a predetermined angle upon mold touch, which is when the movable mold 12 touches the fixed mold 11.

The clamping device 100 has a mold-thickness adjusting mechanism 180 that adjusts the thickness of the mold by adjusting the distance L between the fixed platen 110 and the toggle support 130. The mold-thickness adjusting mechanism 180 has a screw shaft 181 that is formed in the rear end part of the tie bar 140, a screw nut 182 that is rotatably held by the toggle support 130, and a mold-thickness adjusting motor 183 that makes the screw nut 182 to be screwed into the screw shaft 181 rotate.

The screw shaft 181 and the screw nut 182 are provided per tie bar 140. The rotation of the mold-thickness adjusting motor 183 may be sent to a plurality of screw nuts 182 via a rotation transmission part 185. These screw nuts 182 can rotate synchronously.

Note that it is also possible to rotate a plurality of screw nuts 182 individually by switching around the transmission path of the rotation transmission part 185.

The rotation transmission part 185 is composed of, for example, gears and the like. In this case, passive gears are formed on the outer circumference of each screw nut 182, a drive gear is attached to the output shaft of the mold-thickness adjusting motor 183, and an intermediate gear that meshes with a plurality of passive gears and drive gear is rotatably held in the center part of the toggle support 130.

Note that the rotation transmission part 185 may be composed of belts, pulleys, or the like, instead of gears.

The operation of the mold-thickness adjusting mechanism 180 is controlled by the control device 700. The control device 700 drives the mold-thickness adjusting motor 183 and make the screw nuts 182 rotate, thereby adjusting the position of the toggle support 130 that rotatably holds the screw nuts 182, with respect to the fixed platen 110, and adjusting the distance L between the fixed platen 110 and the toggle support 130.

The distance L is detected by using the mold-thickness adjusting motor encoder 184. The mold-thickness adjusting motor encoder 184 detects the amount of rotation, the direction of rotation, and so forth of the mold-thickness adjusting motor 183, and sends a signal indicating the detection result to the control device 700. The detection result of the mold-thickness adjusting motor encoder 184 is used to monitor and control the position and distance L of the toggle support 130.

Note that, as for a toggle support position sensor for detecting the position of the toggle support 130 and a distance sensor for detecting the distance L, these are by no means limited to the mold-thickness adjusting motor encoder 184, and more general ones can be used.

The mold-thickness adjusting mechanism 180 adjusts the distance L by rotating one of the screw shaft 181 and the screw nuts 182 that are screwed together. A plurality of mold-thickness adjusting mechanisms 180 may be used, or a plurality of mold-thickness adjusting motors 183 may be used.

Note that, although the clamping device 100 of this embodiment is a horizontal type in which the mold opens and closes horizontally, but may be a vertical type in which the mold opens and closes vertically.

Also, the clamping device 100 of this embodiment has the clamping motor 160 as a drive source, but may have an oil-pressure cylinder instead of the clamping motor 160. Also, the clamping device 100 may have a linear motor for opening and closing the mold, and have an electromagnet for clamping the mold.

<<Ejector Device>>

The ejector device 200 ejects a molded product from the mold device 10. The ejector device 200 includes an ejector motor 210, a motion conversion mechanism 220, an ejector rod 230, and the like.

In the following description of the ejector device 200, similarly to the description of the clamping device 100, the direction in which the movable platen 120 moves when the mold closes is the front (the right in FIG. 1 and FIG. 2), and the direction in which the movable platen 120 moves when the mold opens is the rear (the left in FIG. 1 and FIG. 2).

The ejector motor 210 is attached to the movable platen 120. The ejector motor 210 is directly connected to the motion conversion mechanism 220, but may be connected to the motion conversion mechanism 220 via a belt, a pulley, or the like.

The motion conversion mechanism 220 converts the rotational motion of the ejector motor 210 into linear motion of the ejector rod 230. The motion conversion mechanism 220 includes a screw shaft, and a screw nut that is screwed into the screw shaft. A ball or a roller may be interposed between the screw shaft and the screw nut.

The ejector rod 230 is free to move forward and backward in a through-hole in the movable platen 120. The front end part of the ejector rod 230 contacts the movable member 15. The movable member 5 is provided inside the movable mold 12, free to move forward and backward. The front end part of the ejector rod 230 may or may not be connected with the movable member 15.

The ejector device 200 performs the ejection step under the control of the control device 700.

In the ejection step, the ejector motor 210 is driven to move the ejector rod 230 forward at a set speed, from the retracted position to an ejecting position, thereby moving the movable member 15 forward and ejecting the molded product. After that, the ejector motor 210 is driven to move the ejector rod 230 backward at a set speed, moving the movable member 15 back to the previous retracted position. The position, speed, and so forth of the ejector rod 230 are detected by using, for example, an ejector motor encoder 211. The ejector motor encoder 211 detects the rotation of the ejector motor 210, and sends a signal indicating the detection result to the control device 700.

Note that, as for an ejector rod position sensor for detecting the position of the ejector rod 230 and an ejector rod speed sensor for detecting the speed of the ejector rod 230, these are by no means limited to the ejector motor encoder 211, and more general ones can be used.

<<Injection Device>>

The injection device 300 is installed on a slide base 301 that can move forward and backward with respect to the frame Fr. The injection device 300 can move forward and backward with respect to the mold device 10. The injection device 300 touches the mold device 10, and fills the cavity space 14 in the mold device 10 with the molding material. The injection device 300 includes, for example, a cylinder 310, a nozzle 320, a screw 330, a measurement motor 340, an injection motor 350, a pressure sensor 360, and so forth.

In the following description of the injection device 300, the direction in which the injection device 300 gets closer to the mold device 10 is the front (the left in FIG. 1 and FIG. 2), and the direction in which the injection device 300 goes away from the mold device 10 is the rear (the right in FIG. 1 and FIG. 2).

The cylinder 310 heats the molding material that is supplied inside from a supply port 311. The molding material includes, for example, a resin or the like. The molding material is, for example, formed in pellets, and supplied to the supply port 311 in a solid state. The supply port 311 is formed in the rear part of the cylinder 310. A cooler 312 such as a water-cooled cylinder is provided in the outer periphery of the rear part of the cylinder 310. A heater 313 such as a band heater and a temperature sensor 314 are provided around the outer periphery of the cylinder 310, on the front side of the cooler 312.

The cylinder 310 is divided into a plurality of zones in the axial direction of the cylinder 310 (the left and right in FIG. 1 and FIG. 2). The heater 313 and the temperature sensor 314 are provided in each zone. The control device 700 controls the heater 313, on a per zone basis, such that the temperature detected by the temperature sensor 314 is a set temperature.

The nozzle 320 is provided in the front end part of the cylinder 310 and pressed against the mold device 10. The heater 313 and the temperature sensor 314 are provided around the outer periphery of the nozzle 320. The control device 700 controls the heater 313 such that the detected temperature of the nozzle 320 is a set temperature.

The screw 330 is provided in the cylinder 310 such that the screw 330 is free to rotate and free to move forward and backward. When the screw 330 rotates, the molding material is sent forward following the spiral thread of the screw 330. The molding material, while being sent forward, is melted gradually by the heat from the cylinder 310. As the liquid molding material is sent to the front of the screw 330 and accumulated in front of the cylinder 310, the screw 330 is moved backward. Subsequently, when the screw 330 is moved forward, the liquid molding material accumulated in front of the screw 330 is injected from the nozzle 320 and fills the inside of the mold device 10.

A backflow preventing ring 331 is attached to the front part of the screw 330 such that the backflow preventing ring 331 is free to move forward and backward. The backflow preventing ring 331 serves as a backflow preventing valve for preventing the backflow of the molding material when the screw 330 is pushed forward and the molding material is sent from the front to the rear.

When the screw 330 moves forward, the backflow preventing ring 331 is pushed backward by the pressure of the molding material that is located in front of the screw 330, and moves backward with respect to the screw 330, to a blocking position (see FIG. 2) where the backflow preventing ring 331 blocks the channel of the molding material. By this means, the molding material accumulated in front of the screw 330 is prevented from flowing backward.

Meanwhile, when the screw 330 is rotated, the backflow preventing ring 331 is pushed forward by the pressure of the molding material that is sent forward along the spiral thread of the screw 330, and moves forward with respect to the screw 330, up to the open position, which is where the channel for the molding material opens up (see FIG. 1). By this means, the molding material is sent to the front side of the screw 330.

The backflow preventing ring 331 may be either a co-rotating type that rotates with the screw 330 or a non-co-rotating type that does not rotate with the screw 330.

Note that the injection device 300 may have a drive source that makes the backflow preventing ring 331 move forward and backward between the open position and the closing position with respect to the screw 330.

The measurement motor 340 makes the screw 330 rotate. The drive source for rotating the screw 330 is not limited to the measurement motor 340, and may be, for example, an oil-pressure pump or the like.

The injection motor 350 makes the screw 330 move backward and forward. Between the injection motor 350 and the screw 330, a motion conversion mechanism for converting the rotational motion of the injection motor 350 into linear motion of the screw 330, and the like are provided.

The motion conversion mechanism has, for example, a screw shaft, and a screw nut that is screwed into the screw shaft. A ball, a roller, or the like may be provided between the screw shaft and the screw nut. The drive source for making the screw 330 move forward and backward is not limited to the injection motor 350, and, for example, an oil-pressure cylinder or the like may be used.

The pressure sensor 360 detects the pressure that is sent between the injection motor 350 and the screw 330. The pressure sensor 360 is provided on the transmission path of force between the injection motor 350 and the screw 330, and detects the pressure that acts on the pressure sensor 360.

The pressure sensor 360 sends a signal indicating the detection result to the control device 700. The detection result of the pressure sensor 360 is used to control or monitor the pressure the screw 330 receives from the molding material, the back pressure on the screw 330, the pressure acting on the molding material from the screw 330, and so forth.

The injection device 300 performs a measurement step, a filling step, a pressure-holding step, and so forth, under the control of the control device 700.

In the measurement step, the measurement motor 340 is driven to rotate the screw 330 at a set number of rotations per unit time, and the molding material is sent forward along the spiral thread of the screw 330. Accompanying this, the molding material melts gradually. As the liquid molding material is sent to the front of the screw 330 and accumulated in front of the cylinder 310, the screw 330 is moved backward. The number of rotations of the screw 330 per unit time is detected by using, for example, a measurement motor encoder 341. The measurement motor encoder 341 detects the rotation of the measurement motor 340, and sends a signal indicating the detection result to the control device 700.

Note that, as for a screw rotation sensor for detecting the number of rotations of the screw 330 per unit time, this is no means limited to the measurement motor encoder 341, and a more general one can be used.

In the measurement step, the injection motor 350 may be driven to apply a setback pressure to the screw 330, so as to prevent the screw 330 from moving backward suddenly. The back pressure on the screw 330 is detected by using, for example, a pressure sensor 360. The pressure sensor 360 sends a signal indicating the detection result to the control device 700. When the screw 330 moves back to the position where the measurement ends and a predetermined amount of molding material is accumulated in front of the screw 330, the measurement step is completed.

In the filling step, the injection motor 350 is driven to move the screw 330 forward at a set speed. The cavity space 14 in the mold device 10 is filled with the liquid molding material accumulated in front of the screw 330. The position and speed of the screw 330 are detected by using, for example, an injection motor encoder 351. The injection motor encoder 351 detects the rotation of the injection motor 350 and sends a signal indicating the detection result to the control device 700. When the position of the screw 330 reaches a set position, the filling step switches to the pressure-holding step (this switch is commonly referred to as "V/P switchover"). The position where the V/P switchover takes place is also referred to as the "V/P switchover position." The set speed of the screw 330 may be changed according to the position of the screw 330, the time, and so forth.

Note that after the screw 330 reaches the set position in the filling step, the screw 330 may be temporarily stopped at that set position, and then the V/P switchover may be made. Shortly before the V/P switchover, the screw 330 may be moved forward or backward at a low speed, instead of stopping the screw 330. Also, as for a screw position sensor for detecting the position of the screw 330 and a screw speed sensor for detecting the speed of the screw 330, these are by no means limited to the injection motor encoder 351, and more general ones can be used.

In the pressure-holding step, the injection motor 350 is driven to push the screw 330 forward, the pressure on the molding material in the front end part of the screw 330 (hereinafter also referred to as "holding pressure") is kept at a set pressure, and the molding material remaining in the cylinder 310 is pushed towards the mold device 10. The shortage of molding material due to cooling-induced contraction inside the mold device 10 can be replenished. The holding pressure is detected by using, for example, a pressure sensor 360. The pressure sensor 360 sends a signal indicating the detection result to the control device 700. The set value of the holding pressure may be changed according to the time passed since the start of the pressure-holding step, and so forth.

In the pressure-holding step, the molding material of the cavity space 14 in the mold device 10 is gradually cooled, and, when the pressure-holding step is completed, the inlet of the cavity space 14 sealed with the solidified molding material. This state is referred to as "gate seal," and the backflow of the molding material from the cavity space 14 is prevented therewith. After the pressure-holding step, the cooling step is started. In the cooling step, the molding material in the cavity space 14 is solidified. The measurement step may be performed during the cooling step, so as to reduce the molding cycle time.

Note that, although the injection device 300 of this embodiment employs an in-line screw method, a pre-plunger method or the like may be employed as well. The pre-plunger-type injection device supplies the molding material melted in a plasticized cylinder, to an injection cylinder, and injects the molding material from the injection cylinder into the mold device. A screw is provided in the plasticized cylinder, rotatably, or rotatably and being free to move forward and backward. A plunger is provided inside the injection cylinder, free to move forward and backward.

Also, although the injection device 300 of this embodiment is a horizontal type in which the axial direction of the cylinder 310 is horizontal, the injection device 300 may be a vertical type in which the axial direction of the cylinder 310 is vertical. The clamping device to be combined with a vertical injection device 300 may be vertical or horizontal. Similarly, the clamping device to be combined with a horizontal injection device 300 may be horizontal or vertical.

<<Move Device>>

The move device 400 allows the injection device 300 to move forward or backward with respect to the mold device 10. Also, the move device 400 presses the nozzle 320 against the mold device 10 to generate a nozzle touch pressure. The move device 400 has a liquid-pressure pump 410, a motor 420 to serve as a drive source, a liquid-pressure cylinder 430 to serve as a liquid-pressure actuator, and the like.

In the following description of the move device 400, as in the description of the injection device 300, the direction in which the injection device 300 gets closer to the mold device 10 is the front (the left in FIG. 1 and FIG. 2), and the direction in which the injection device 300 goes away from the mold device 10 is the rear (the right in FIG. 1 and FIG. 2).

Note that the move device 400 is placed on one side of the cylinder 310 of the injection device 300 in FIG. 1 and FIG. 2, but may be placed on both sides of the cylinder 310, or placed symmetrically about the cylinder 310.

The liquid-pressure pump 410 has a first port 411 and a second port 412. The liquid-pressure pump 410 is a pump that can rotate in both directions, and, by switching the direction of rotation of the motor 420, the liquid-pressure pump 410 sucks in the hydraulic fluid (for example, oil) from one of the first port 411 and the second port 412 and discharges it from the other one, thereby generating a hydraulic pressure. Also, the liquid-pressure pump 410 can also suck in the hydraulic fluid from a tank and discharge it from one of the first port 411 or the second port 412.

The motor 420 makes the liquid-pressure pump 410 operate. The motor 420 drives the liquid-pressure pump 410 in the rotation direction and with rotation torque in accordance with control signals from the control device 700. The motor 420 may be an electric motor or an electric servo motor.

The liquid-pressure cylinder 430 has a cylinder body 431, a piston 432, and a piston rod 433. The cylinder body 431 is fixed to the injection device 300. The piston 432 divides the inside of the cylinder body 431 into a front chamber 435 that serves as a first chamber and a rear chamber 436 that serves as a second chamber. The piston rod 433 is fixed to the fixed platen 110.

The front chamber 435 of the liquid-pressure cylinder 430 is connected with the first port 411 of the liquid-pressure pump 410 via a first channel 401. The hydraulic fluid discharged from the first port 411 is supplied into the front chamber 435 via the first channel 401, so that the injection device 300 is pushed forward. As the injection device 300 moves forward, the nozzle 320 is pressed against the fixed mold 11. The front chamber 435 functions as a pressure chamber that generates a nozzle touch pressure of the nozzle 320 by using the pressure of the hydraulic fluid supplied from the liquid-pressure pump 410.

Meanwhile, the rear chamber 436 of the liquid-pressure cylinder 430 is connected with the second port 412 of the liquid-pressure pump 410 via a second channel 402. The hydraulic fluid discharged from the second port 412 is supplied into the rear chamber 436 of the liquid-pressure cylinder 430 via the second channel 402, so that the injection device 300 is pushed backward. As the injection device 300 moves backward, the nozzle 320 is separated from the fixed mold 11.

Note that the move device 400 is not limited to the configuration including the liquid-pressure cylinder 430. For example, it is possible to use an electric motor and a motion conversion mechanism that converts the rotational motion of the electric motor into linear motion of the injection device 300, instead of using the liquid-pressure cylinder 430.

<<Controller>>

The control device 700 performs various controls related to the injection molding machine 1 by sending control signals directly to the clamping device 100, the ejector device 200, the injection device 300, the move device 400, and so forth.

The control device 700 may be implemented by any hardware or by any combination of hardware and software. The control device 700 is mainly composed of a computer having, for example, a CPU (Central Processing Unit) 701, a memory device 702, a secondary memory device 703, and an input/output interface device 704. The control device 700 performs various controls by making the CPU 701 execute programs installed in the secondary memory device 703.

Also, the control device 700 receives signals from the outside or outputs signals to the outside through the interface device 704. For example, the control device 700 is communicably connected with the managing device 2, through the communication network NW, based on the interface device 704. Also, the control device 700 may be communicably connected with (the control device 700 of) another injection molding machine 1, through the communication network NW, based on the interface device 704.

The functions of the control device 700 may be implemented by, for example, a single controller, or may be shared by a plurality of controllers. For example, the control device 700 includes an upper-level controller that controls the overall operation (sequence) of the injection molding machine 1, and a lower-level controller that controls the individual operations of a plurality of actuators for implementing the overall operation of the injection molding machine 1. The upper-level controller is, for example, a PLC (Programmable Logic Controller). The lower-level controller is, for example, a motion controller.

The control device 700 makes the injection molding machine 1 repeat the mold-closing step, the mold-clamping step, the mold-opening step, and so forth, thereby repeatedly manufacturing the molded products. Also, the control device 700 makes the injection device 300 perform the measurement step, the filling step, the pressure-holding step, and so forth, during the mold-clamping step.

The series of operations for having a molded product is also referred to as a "shot" or a "molding cycle." This includes, for example, the operation from the start of the measurement step by the injection device 300, up to the start of the next measurement step by the injection device 300. Also, the time required for one shot is also referred to as "molding cycle time."

One molding cycle is composed of, for example, a measurement step, a mold-closing step, a mold-clamping step, a filling step, a pressure-holding step, a cooling step, a mold-opening step, and an ejection step, performed in this order. This order is the order of starting each step. Also, the filling step, the pressure-holding step, and the cooling step are performed between the start of the mold-clamping step and the end of the mold-clamping step. Also, the end of the mold-clamping step matches with the start of the mold-opening step.

Note that multiple steps may be performed simultaneously in order to shorten the molding cycle time. For example, the measurement step may be performed during the cooling step in the previous molding cycle. In this case, the mold-closing step may be performed at the beginning of the molding cycle. Also, the filling step may be started during the mold-closing step. The ejection step may be started during the mold-opening step. Furthermore, when an on-off valve for opening and closing the channel of the nozzle 320 of the injection device 300 is provided, the mold-opening step may be started during the measurement step. This is because, even if the mold-opening step is started during the measurement step, the molding material does not leak from the nozzle 320 as long as the on-off valve closes the channel of the nozzle 320.

The control device 700 is connected with an operating device 750, a display device 760, and the like.

The operating device 750 receives an operation input that relates to the injection molding machine 1 from the user, and outputs a signal corresponding to that operation input to the control device 700.

The display device 760 displays various images under the control of the control device 700.

The display device 760 displays, for example, an operation screen that relates to the injection molding machine 1 and corresponds to the operation input received in the operating device 750.

The operation screen displayed on the display device 760 is used, for example, for configuring various settings related to the injection molding machine 1. Configuring these settings related to the injection molding machine 1 include, for example, setting up the molding conditions for the injection molding machine 1 (to be more specific, inputting the setting values through the operating screen displayed on the display device 760). Furthermore, configuring the settings related to the injection molding machine include setting the selection of the type of detected values of various sensors and the like for the injection molding machine 1, recorded as logging data for during the molding operation. Also, configuring the settings related to the injection molding machine 1 include, for example, setting up the mode of display for the detection values of various sensors (past performance values) and the like, on the display device 760, related to the injection molding machine 1 during the molding operation (for example, the types of actual values to display, how to display these values, etc.). A plurality of operation screens may be prepared, switched by the display device 760 and displayed, or displayed overlapping each other. The user can configure the settings for the injection molding machine 1 (including inputting the setting values) by operating the operating device 750 while looking at the operation screen displayed on the display device 760.

Also, the display device 760 displays, for example, an information screen that provides the user with various information, according to the operations made on the operation screen, under the control of the control device 700. A plurality of information screens may be prepared, switched by the display device 760 and displayed, or displayed in an overlapping each other. For example, the display device 760 displays the setting elements related to the injection molding machine 1 (for example, the setting elements related to the molding conditions of the injection molding machine 1). Also, for example, the display device 760 displays management information (for example, information related to the operation record of the injection molding machine 1). The operating device 750 and the display device 760 may be configured as, for example, a touch panel-type display, and thus integrated as one.

Note that the operating device 750 and the display device 760 of this embodiment are integrated, but may be provided separately as well. Also, a plurality of operating devices 750 may be provided. Instead of, or in addition to, the operating device 750, other input devices that accept inputs other than the user's operational inputs may be provided. Such input devices may include, for example, a sound/voice input device that receives the user's sound/voice as input, a gesture input device that receives the user's gesture as input, and so forth. The sound/voice input device may be, for example, a microphone or the like. Also, the gesture input device may be, for example, a camera (imaging device) or the like.

<Managing Device>

As described above, the managing device 2 is communicably connected with the injection molding machine 1 through the communication network NW.

The managing device 2 is, for example, a cloud server installed at a remote location, such as a management center outside the factory where the injection molding machine 1 is installed. Also, the managing device 2 may be an edge server that is installed, for example, inside the factory where the injection molding machine 1 is installed, at a place relatively close to the factory (for example, in a radio base station or a building near the factory, etc.). and so on. Also, the managing device 2 may be a terminal device (for example, a desktop computer terminal) in the factory where the injection molding machine 1 is installed. Furthermore, the managing device 2 may be a portable terminal that the administrator of the injection molding machine 1 or the like can carry with him/her (for example, a smartphone, a tablet terminal, a laptop computer terminal, etc.).

The managing device 2 can, for example, learn about the operating status of the injection molding machine 1 based on data sent (uploaded) from the injection molding machine 1, and thus manage the operating status of the injection molding machine 1. Also, the managing device 2 can perform various diagnoses such as an abnormality diagnosis for the injection molding machine 1, based on the learned operating status of the injection molding machine 1. Also, the managing device 2 may send control data (for example, data related to various setting conditions such as molding conditions) to the injection molding machine 1 through, for example, the communication network NW. By this means, the managing device 2 can control the operation of the injection molding machine 1.

[Details of Control Sequence Configuration]

Next, the configuration of the control sequence of the injection molding machine 1 will be described in detail with reference to FIG. 3.

Figures 3, 4:
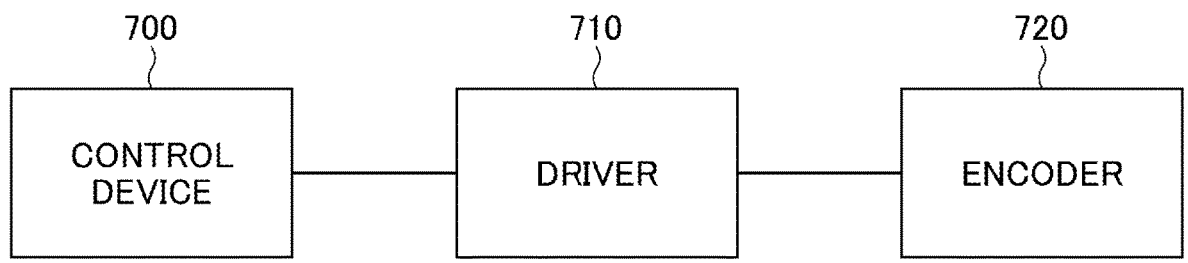
FIG. 3 is a diagram showing an example configuration of a control sequence of the injection molding machine.
FIG. 4 is a diagram showing an example configuration of table information (adaptable version table) related to the versions of a driver and an encoder with which a control device can ensure data compatibility.

FIG. 3 is a diagram showing an example configuration of the control sequence of the injection molding machine 1.

As shown in FIG. 3, the control sequence of the injection molding machine 1 includes a control device 700, a driver 710, and an encoder 720.

In this example, a physical communication cable connects between the control device 700 and the driver 710, and between the driver 710 and the encoder 720, and a communicable logical network (field network) is built between the control device 700 and each of the driver 710 and the encoder 720. Industrial Ethernet (registered trademark) communication standards used in the field network include, for example, MECHATROLINK, CC-Link, EtherCAT, PROFINET, and so forth.

Note that, instead of building a field network, the control device 700 and each of the driver 710 and the encoder 720 may be connected by using a physical communication cable.

The control device 700 controls various electric actuators (hereinafter simply "electric actuators") that enable the operation of the injection molding machine 1. The electric actuators include, for example, the above-described clamping motor 160, mold-thickness adjusting motor 183, ejector motor 210, measurement motor 340, injection motor 350, a motor 420, and so forth. The control device 700 generates control data that relates to the electric actuators that are under control, and outputs (sends) the control data to the driver 710. Also, the control device 700 may generate control data related to the encoders 720 (for example, data related to setting conditions such as the cycle of acquiring detection data) and send it to the encoder 720.

The driver 710 drive the electric actuators. The driver 710 is provided for each of a plurality of electric actuators such as the above-mentioned clamping motor 160, mold-thickness adjusting motor 183, ejector motor 210, measurement motor 340, injection motor 350, and motor 420. The driver 710 outputs a drive current to the electric actuators, for example, based on control data received from the control device 700. By this means, the control device 700 can control the operation of the electric actuators under control, via the driver 710. Also, the driver 710 may send data related to the actual operating status of the driver 710 (injection molding machine 1) (for example, data such as command values and past performance values of the drive current) to the control device 700.

The encoders 720 acquire detection data regarding the mechanical positions of the electric actuators. The encoders 720 include, for example, the above-described clamping motor encoder 161, mold-thickness adjusting motor encoder 184, ejector motor encoder 211, measurement motor encoder 341, injection motor encoder 351, and the like. The encoders 720 output (send) detection data to the control device 700. By this means, the control device 700 can control the electric actuators by learning about the positions and the operating status (for example, the speed, acceleration, etc.) of the electric actuators based on detection data related to the positions of the electric actuators.

[Version Matching Between Devices/Units of Injection Molding Machine]

Next, version matching between devices/units in the control sequence will be described below with reference to FIG. 4 to FIG. 13, in addition to FIG. 3. Although version matching between the control device 700 and each of the driver 710 and the encoder 720 will be described below as an example, the same details may apply to version matching between any unspecified devices/units mounted on the injection molding machine 1. For example, the same details may apply to version matching among a plurality of controllers that may be included in the control device 700 (for example, an upper-level controller that serves as a master and a lower-level controller that serves as a slave).

The version is specified for each of the control device 700, the driver 710, and the encoder 720. The version is represented by a numerical value, with "1.0" representing the initial state, for example. When at least one of the hardware and software of a target device/unit is revised, the version number increases. For example, in the event a relatively minor revision is made, the part of the version number after the decimal point increases. In the event a relatively major revision is made, the version number carries to the next integer value (for example, if the current version is "3.43," it carries to "4.0"). To say that a target device/unit is revised means, for example, functions are added to the device/unit, changes are made to its specifications, and so forth. Hereinafter, an increase in the numerical value of the version of a target device/unit is referred to as a "version-up(grading)." On the other hand, the numerical value of the version of a target device/unit might also decrease. This is when, for example, a failure occurs in a target device/device, the device/unit is replaced with the same device/unit of an older version than the failed device/unit, and so forth. Hereinafter, a decrease in the numerical value of the version of a target device/unit is referred to as a "version-down(grading)." Below, the same may apply to the versions of the injection molding machine 1 and the managing device 2, and the versions of a higher injection molding machine 1 (master machine) and another injection molding machine 1 (slave machine).

As described earlier, the control device 700 sends control data to the driver 710, and the driver 710 receives the control data from the control device 700. Also, the encoder 720 sends detection data to the control device 700, and the control device 700 receives the detection data from the encoder 720. Therefore, the control sequence has to ensure data compatibility (for example, the compatibility of data's specifications such as data format and the elements included in the data) between the sender and the receiver. In other words, from the viewpoint of data compatibility, the version must match between the sender and the receiver. Therefore, in this example, table information (hereinafter referred to as "adaptable version table") related to the versions of the driver 710 and the encoder 720 that the control device 700 can support from the viewpoint of data compatibility is defined. The range of versions for the driver 710 that the control device 700 can support refers to the range of versions for the driver 710 in which the driver 710 can properly identify the elements of control data sent from the control device 700. Also, the range of versions for the encoder 720 that the control device 700 can support refers to the range of versions for the encoder 720 in which the encoder 720 can output detection data that the control device 700 can properly identify.

For example, FIG. 4 is a diagram showing an example configuration of table information (adaptable version table) related to the versions of the driver 710 and the encoder 720 that the control device 700 can support.

Referring to FIG. 4, the adaptable version table includes, for example, a row that shows the current version of the control device 700 (hereinafter referred to as "controller"). Also, the adaptable version table includes, for example, rows that show the range of versions (the highest version and the lowest version) for each of the driver 710 and the encoder 720 that the control device 700 of the current version can support from the viewpoint of data compatibility.

The adaptable version table is registered in advance with an internal memory such as the secondary memory device 703 of the control device 700 or the like. The control device 700 updates the adaptable version table in accordance with the changes of the version of the control device 700. This is because the range of versions for the driver 710 and the encoder 720 that the control device 700 can support is uniquely determined for each version of the control device 700. In this case, the elements of the range of versions for the driver 710 and the encoder 720 that the version of the control device 700 can support may be delivered from, for example, an external device (for example, the managing device 2) that provides update data for upgrading the version of the control device 700.

For example, FIG. 5 is a diagram showing a first set of examples of specific elements of the adaptable version table of the control device 700. To be more specific, FIG. 5 shows an adaptable version table for when the injection molding machine 1 (the control device 700, the driver 710, and the encoder 720) are in the initial state (for example, factory default).

As shown in FIG. 5, the current version of the control device 700 is specified as "1.0," which corresponds to the initial state. Also, since the current versions for the driver 710 and the encoder 720 are all "1.0," which corresponds to the initial state, the highest versions and the lowest versions for the driver 710 and the encoder 720 that the control device 700 can support are also all specified as "1.0."

Here, the software of the control device 700 might be revised within a range that does not influence the data compatibility with the driver 710 and the encoder 720, and thereupon the version of the control device 700 might be upgraded. In this case, only the current versions for the control device 700 in the adaptable version table are updated.

For example, FIG. 6 is a diagram showing a second set of examples of specific elements of the adaptable version table of the control device 700. To be more specific, FIG. 6 shows an adaptable version table in which, from the state of the first set of examples (FIG. 5) described above, the version of the control device 700 is upgraded from "1.0" to "1.1," within a range that does not influence the data compatibility with the driver 710 and the encoder 720.

As shown in FIG. 6, based on FIG. 5, the adaptable version table is updated from the state in which the version of the control device 700 is specified as "1.0," to the state in which it is specified as "1.1."

For example, the control device 700 updates the adaptable version table in accordance with the version-up of the control device 700. Also, it is possible to employ a mode here in which an updated adaptable version table is delivered to the control device 700 from an external device or the like (for example, the managing device 2) that provides update data for upgrading the version of the control device 700. In this case, the control device 700 can also employ a mode in which the old adaptable version table is replaced with the new, updated adaptable version table that is delivered. Below, the same may apply to the case of updating to the adaptable version tables of FIG. 9, FIG. 10, FIG. 13, FIG. 20 to FIG. 22, and so forth.

Here, the driver 710 has improved functions, and the data format of control data that the driver 710 can identify changes, so that the version of the driver 710 might be upgraded.

For example, FIG. 7 and FIG. 8 are diagrams showing a set of examples and another set of examples of control data sent from the control device 700 to the driver 710. To be more specific, FIG. 7 shows a data format of control data that the driver 710 in the initial state (version "1.0") (before a version-up) can identify. FIG. 8 shows a data format of control data that the driver 710 after a version-up (version "2.0") can identify. The following description will be provided assuming that the communication network including the control device 700, the driver 710, and the encoder 720 in the control sequence of the injection molding machine 1 can send and receive three pieces of 32-bit data ("data 1" to "data 3").

As shown in FIG. 7, in the control data before a version-up, a speed command value for the electric actuator is defined in data 1, the electric actuator's torque limit value (highest value) is defined in data 2, and the electric actuator's torque limit value (lowest value) is defined in data 3.

In contrast with this, as shown in FIG. 8, in the control data after a version-up, while the same speed command value is defined in data 1 as before the version-up, a feedforward (FF) command value for the torque of the electric actuator is defined in data 2. This is because, in this example, the functions of the driver 710 are improved and enable feedforward control of torque. Then, in the control data after the version-up, a torque limit value (the highest value) is defined in the first-half 16 bits of data 3, and another torque limit value (the lowest value) is defined in the second-half 16 bits. This is because a data amount of 32 bits is not necessary to represent the torque limit values.

For example, as shown in FIG. 7 and FIG. 8, when the data format of control data that the driver 710 can identify changes, the data format of control data to be generated by the control device 700 also needs to conform to that change. Therefore, following a version-up of the driver 710 ("1.0"→"2.0"), the version of the control device 700 is also upgraded ("1.1", "2.0").

For example, FIG. 9 is a diagram showing a third set of examples of specific elements of the adaptable version table of the control device 700. To be more specific, FIG. 9 shows an adaptable version table in which the version of the driver 710 is upgraded from "1.0" to "2.0" so that the identifiable data format of control data is changed, and the version of the control device 700 is also upgraded from "1.0" to "2.0."

As shown in FIG. 9, based on FIG. 6, the adaptable version table is updated from the state in which the version of the control device 700 is specified as "1.1" to the state in which it is specified as "2.0." Also, based on FIG. 6, the adaptable version table is updated from the state in which the highest version and the lowest version of the driver 710 that the control device 700 can support from the viewpoint of data compatibility are both specified as "1.0," to the state in which these are specified as "2.0." This is because, given the version-up from "1.1" to "2.0," the control device 700 must output the control data in the new format (the data format of FIG. 8) and cannot output the control data in the old format (FIG. 7).

Here, the functions of the driver 710 might be improved within a range that does not influence the data compatibility with the control device 700, and the version of the driver 710 might be upgraded. In this case, the control device 700 can support both the version of the driver 710 before the version-up and the version of the driver 710 after the version-up. Therefore, a relatively minor revision of introducing an additional version that the driver 710 can support is made to the control device 700, and thus the version of the control device 700 is upgraded.

For example, FIG. 10 is a diagram showing a fourth set of examples of specific elements of the adaptable version table of the control device 700. To be more specific, FIG. 10 shows an adaptable version table, in which the version of the driver 710 is upgraded from "2.0" to "3.0," within a range that does not influence the data compatibility with the control device 700, and in which, furthermore, the version of the control device 700 is also upgraded from "2.0" to "2.1."

As shown in FIG. 10, based on FIG. 9, the adaptable version table is updated from the state in which the version of the control device 700 is specified as "2.0," to the state in which it is specified as "2.1." Also, based on FIG. 9, the adaptable version table is updated from the state in which the highest version of the driver 710 that the control device 700 can support from the viewpoint of data compatibility is specified as "2.0," to the state in which it is specified as "3.0."

Here, the functions of the encoder 720 are improved and the data format in which detection data can be output from the encoder 720 is changed, so that the version of the encoder 720 might also be upgraded.

For example, FIG. 11 and FIG. 12 are diagrams showing an example and another example of detection data sent from the encoder 720 to the control device 700. To be more specific, FIG. 11 shows a data format in which the encoder 720 in the initial state (version "1.0") (before the version-up) can output detection data. FIG. 12 shows a data format of control data that the encoder 720 after the version-up (version "2.0") can identify.

As shown in FIG. 11, in the detection data before the version-up, data that shows the position of the electric actuator (electric motor) during one rotation (referred to as "one-rotation position data") is defined in data 1, and data that shows the status of the encoder 720 is defined in data 2. Also, in the detection data before the version-up, data 3 is not in use.

On the other hand, as shown in FIG. 12, in the detection data after the version-up, multi-rotation position data to show the number of rotations per unit time from a predetermined initial position in either the positive direction or the negative direction is defined in data 1, and one-rotation position data is defined in data 2. Also, in the detection data after the version-up, data to indicate the status of the encoder 720 is defined in data 3, which is not used in the detection data before the version-up.

For example, as shown in FIG. 11 and FIG. 12, when the data format in which the encoder 720 can output detection data changes, the data format of detection data that the control device 700 can identify should also change accordingly. Therefore, following the version-up of the encoder 720 ("1.0"→"2.0"), the version of the control device 700 is also upgraded ("2.1"→"3.0").

For example, FIG. 13 is a diagram showing a fifth set of examples of specific elements of the adaptable version table of the control device 700. To be more specific, FIG. 13 shows an adaptable version table in which the version of the encoder 720 is upgraded from "1.0" to "2.0" so that the data format in which detection data can be output is changed, and the version of the control device 700 is also upgraded from "2.1" to "3.0."

As shown in FIG. 13, based on FIG. 10, the adaptable version table is updated from the state in which the version of the control device 700 is specified as "2.1," to the state in which it is specified as "3.0." Also, based on FIG. 10, the adaptable version table is updated from the state in which the highest version and the lowest version of the encoder 720 that the control device 700 can support from the viewpoint of data compatibility are both specified as "1.0," to the state in which they are both specified as "2.0." This is because, following the version-up from "2.1" to "3.0," the control device 700 becomes capable of properly identifying only the detection data that is provided in the new format (the data format of FIG. 12), and can no longer properly identify the detection data that is provided in the old format (the data format of FIG. 11).

Thus, according to this embodiment, the control device 700 can use an adaptable version table. Therefore, the control device 700 can determine (check) the version matching with each driver 710 and encoder 720 from the viewpoint of the data compatibility of data that is exchanged (control data, detection data, etc.).

[Control Process Related to Version Matching Between Devices/Units of Injection Molding Machine]

Next, a control process related to version matching between devices/units in the control sequence of the injection molding machine 1 (hereinafter referred to as "version matching control process") will be described below with reference to FIG. 14. Although a control process related to version matching between the control device 700 (master) and each of the driver 710 and the encoder 720 (both slaves) will be mainly described below, the same may apply to a process related to version matching between any unspecified devices/units mounted in the injection molding machine 1. For example, the same may apply to a control process related to version matching between an upper-level controller (master) and a lower-level controller (slave) included in the control device 700.

Figure 14:
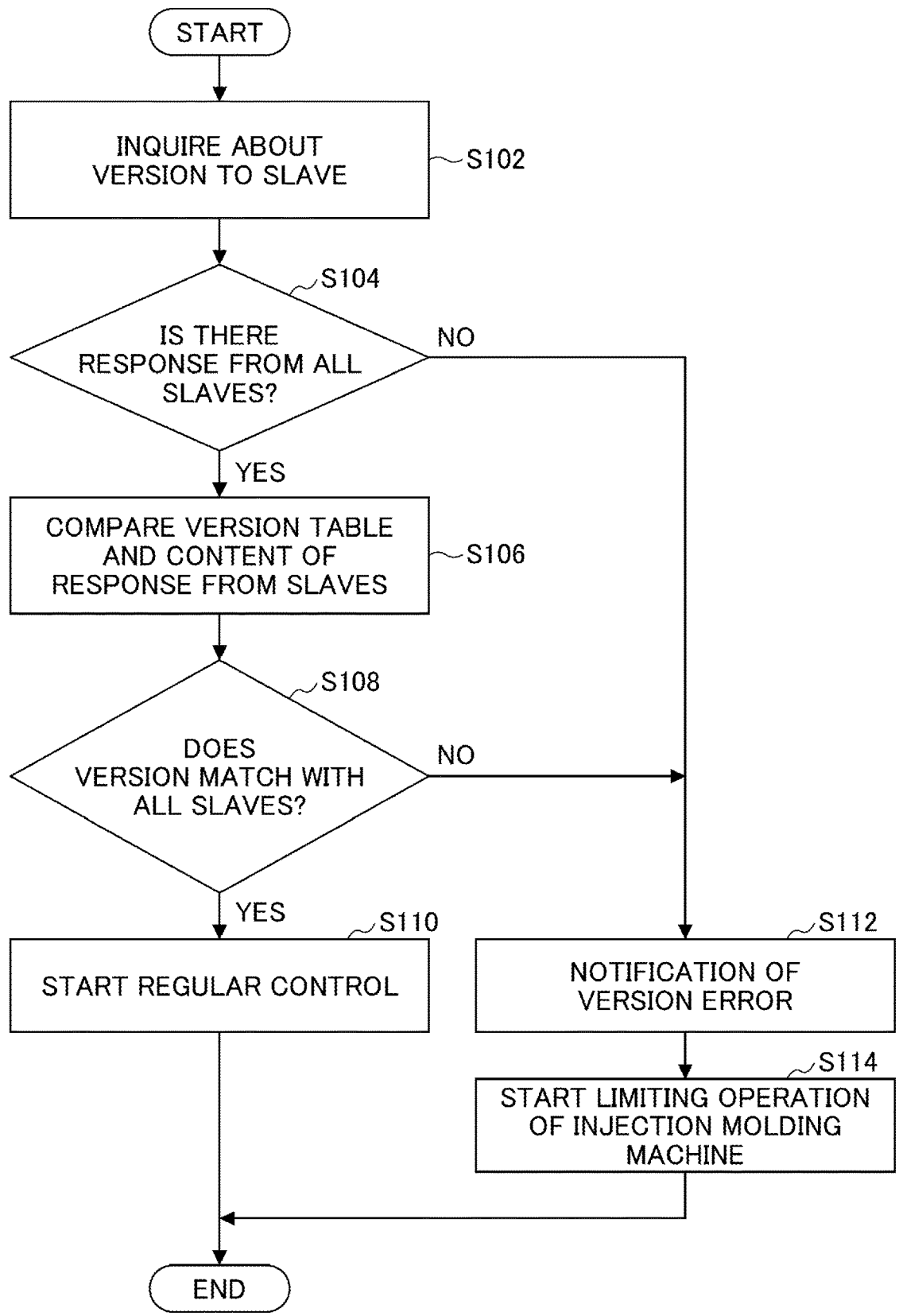
FIG. 14 is a flowchart showing an example control process by the control device.

FIG. 14 is a flowchart that schematically shows an example of a version matching control process by the control device 700. This flowchart is executed, for example, upon the initial process of the control device 700 (that is, when the control device 700 is powered on and various parameters are initialized). The initial process of the control device 700 is executed, for example, when the injection molding machine 1 is activated (that is, when its power is turned on). In this example, the control device 700 is treated as a "master," and the driver 710 and the encoder 720 are treated as "slaves."

As shown in FIG. 14, in step S102, the control device 700 sends a signal for inquiring about the version of each slave (the driver 710 and the encoder 720). When the process of step S102 is completed, the control device 700 proceeds to step S104.

In this example, when the driver 710 and the encoder 720 receive the version-inquiring signal from the control device 700, the driver 710 and the encoder 720 each return a response signal, including data about the current version of the driver 710 or the encoder 720, to the control device 700.

Note that it is possible to employ a mode here in which, for example, at the start of the initial process in the control device 700, the driver 710 and the encoder 720 each automatically send a signal for reporting data about the current version of the driver 710 or the encoder 720, to the control device 700. In this case, the process of step S102 is omitted.

In step S104, the control device 700 determines whether or not response signals to the inquiry signal have been received from all the slaves (the driver 710 and the encoder 720). When the control device 700 receives response signals from all the slaves within a predetermined period of time, the control device 700 proceeds to step S106. On the other hand, if, even after a predetermined time passes, the control device 700 does not receive response signals from at least part of the slaves, the control device 700 determines that there is a version mismatch with the part of the slaves from which no response signal has been received, and proceeds to step S112.

In step S106, the control device 700 compares the adaptable version table with the elements of the response signals from all slaves (the driver 710 and the encoder 720). When the process of step S106 is completed, the control device 700 proceeds to step S108.

In step S108, the control device 700 determines whether or not its version matches with all slaves. To be more specific, the control device 700 determines whether or not each slave's current version is included in the range of versions (that is, the highest version and the lowest version) for target slaves, provided in the adaptable version table as ones that the control device 700 can support. If the versions of all slaves are found matching, the control device 700 proceeds to step S110. If there is a version mismatch with part or all of the slaves, the control device 700 proceeds to step S112.

Note that, for the sake of simplicity, the control device 700 may determine whether or not its version matches with all slaves based on whether or not the version of each slave is the latest one. In this case, unless every slave shows the latest version, the control device 700 determines that a possibility exists of the data not being compatible, regardless of whether each slave's actual version ensures data compatibility or not, and therefore determines that there is a version mismatch. Hereinafter, the same may apply to the case of determining version matching between a managing device 2 (master) and an injection molding machine 1 (slave), and the case of determining version matching between a master machine (injection molding machine 1) and a slave machine (injection molding machine 1).

In step S110, the control device 700 starts the regular control for the electric actuator. By this means, the injection molding machine 1 can shift to, for example, the normal operating status for having a molded product. When the process of step S110 is completed, the control device 700 ends the process of the current flowchart.

On the other hand, in step S112, the control device 700 sends a notification about the version mismatch (version error notification) between the control device 700 and the slave (at least one of the driver 710 and the encoder 720) to the user. For example, the control device 700 may send a version error notification visually, through a display device 760. Also, the control device 700 may send an audible version error notification through a sound output device (for example, a speaker, a buzzer, etc.) provided in the injection molding machine 1.

This version error notification may simply include, for example, information that indicates that a version mismatch has occurred between the control device 700 (master) and the slave (at least one of the driver 710 and the encoder 720). Also, the version error notification may include, for example, information that indicates with which slave among all the slaves the control device 700 is having the version mismatch. By this means, the user is able to learn with which slave the control device 700 (master) is having the version mismatch. Also, in the event no response signal is received from part or all of the slaves ("NO" in step S104) and a version mismatch is therefore determined to be occurring, the version error notification may include information to indicate that. Also, the version error notification includes, for example, information about the applicable version of either the control device 700 (master) or the slave where the version mismatch is occurring. The information about the applicable version is, for example, information about the version of either the control device 700 (master) or the slave, for matching the version between the master and the slave (for example, information to indicate the range of versions). Also, the version error notification may include, for example, information about the method of removing the version mismatch (i.e. a process for uniformizing the versions) between the control device 700 and the slave. That is, the version error notification may include information that prompts removal of the version mismatch between the control device 700 (master) and the slave. By this means, the user can remove the version mismatch more easily. The information about the method of removing the version mismatch may basically include information about the method of upgrading the version of at least one of the control device 700 and the corresponding slave, to a predetermined version. That is, the version error notification may include information that prompts a version-up of at least one of the control device 700 (master) and the corresponding slave, to a predetermined version. Also, the information about the method of removing the version mismatch may include information about the method of downgrading the version of either the control device 700 or the corresponding slave, only under predetermined conditions. That is, the version error notification may include information that prompts a version-down of at least one of the control device 700 (master) and the corresponding slave to a predetermined version only under predetermined conditions. These predetermined conditions may include, for example, that the version mismatch is caused by a software update failure in either the control device 700 or the target slave. This is because, as long as there is a possibility that the update data for a version-up has a problem, another try for the version-up might simply result in a failure of the version-up. In this case, information about the method of downgrading the version of the other one of the control device 700 and the target slave than the one where the software version-up has failed may be reported. Hereinafter, the same may apply to the case of determining version matching between a managing device 2 (master) and an injection molding machine 1 (slave), and the case of determining version matching between a master machine (injection molding machine 1) and a slave machine (injection molding machine 1).

When the process of step S112 is completed, the control device 700 proceeds to step S114.

In step S114, the control device 700 starts limiting the operation of the injection molding machine 1. The limiting of the operation of the injection molding machine 1 includes stopping the operation of the injection molding machine 1, slowing down the operation of the injection molding machine 1 relatively compared to normal times, and so forth. By this means, while data compatibility with the slave is not guaranteed, the control device 700 can prevent the situation where controlling the injection molding machine 1 based on data that is exchanged between the control device 700 and the slave leads to causing the injection molding machine 1 to malfunction. The control device 700 may limit, for example, the operations of all the driven elements (actuators) of the injection molding machine 1. Also, the control device 700 may limit, for example, the operation of only part of the actuators, including particular actuators that are controlled based on data exchanged with a particular slave having a version mismatch.

When the process of step S114 is completed, the control device 700 proceeds to step S116.

Note that the process of step S114 may be omitted. Also, when the condition for determination in step S112 is satisfied, in addition to steps S112 and S114, the control device 700 may record log data of the occurrence of version mismatches between the control device 700 and part or all of the slaves in the secondary memory device 703 or the like.

Thus, if there is a version mismatch between the control device 700 and each of the driver 710 and the encoder 720, the injection molding machine 1 can send a notification about the version mismatch to the user. By this means, the injection molding machine 1 can prompt the user to take measures to remove the version mismatch. Therefore, the injection molding machine 1 can prevent the situation where the compatibility of data exchanged between the control device 700 (master) and at least one of the driver 710 and the encoder 720 (slave) is not ensured, and where therefore the injection molding machine 1 malfunctions due to improper control based on such data.

Note that, in this example, the master among a plurality of devices/units determines whether or not there is a version mismatch with the slaves, but each individual slave may determine whether or not it is having a version mismatch. In this case, for example, a slave device/unit may inquire the master (control device 700) about the range of versions for the slave device/unit that the master can support, and determine whether or not the slave device/unit is having a version mismatch based on the range of versions received from the master. Also, a device/unit (hereinafter referred to as "monitoring device/unit") apart from a plurality of devices/units that are subject to the determination of whether or not there is a version mismatch may determine whether or not there is a version mismatch. In this case, the process of the flowchart of FIG. 14 is carried out by the monitoring device/unit belonging to the same logical network with the plurality of devices/units. However, step S102 of FIG. 14 is replaced by a process of sending version-inquiring signals to the plurality of devices/units, and step S104 is replaced by a process of determining whether or not response signals have been received from all of the plurality of devices/units.

[Process Related to Automatic Removal of Version Mismatch Between Devices/Units of Injection Molding Machine]

Next, a process related to automatic removal of version mismatch between devices/units of the injection molding machine 1 will be described. Although a control process related to version matching between the control device 700 (master) and each of the driver 710 and the encoder 720 (both slaves) will be mainly described below, the same may apply to a control process related to version matching between any unspecified devices/units mounted on the injection molding machine 1. For example, the same may apply to a control process related to version matching between an upper-level controller (master) and a lower-level controller (slave) included in the control device 700.

When there is a version mismatch with part or all of the slaves, the control device 700 may perform a process for automatically removing the version mismatch instead of or in addition to sending a notification about the version mismatch (hereinafter referred to as "automatic mismatch removing process"). The automatic mismatch removing process may be carried out, for example, after the process of step S114 in FIG. 14 is completed, and only in the event of "NO" in step S108 (that is, "NO" in step S104 is not included here). This is because "NO" in step S104 only assumes that there is a version mismatch between the control device 700 and part or all of the slave.

For example, when there is a version mismatch with part or all of the slaves and this version mismatch can be removed only by changing the software, the control device 700 (master) may upgrade the version of the one having the lower version between the control device 700 and the corresponding slave. To be more specific, the control device 700 sends, through the communication network NW, a signal requesting update data for upgrading the version of the one having the lower version between the control device 700 and the corresponding slave, to an external device that would deliver such data (for example, the managing device 2). Then, the control device 700 receives the delivered update data for a version-up, and installs the received update data in the one having the lower version between the control device 700 and the corresponding slave. By this means, the control device 700 can upgrade the version of the one having the lower version between the control device 700 and the corresponding slave.

Furthermore, when, for example, there is a version mismatch with part or all of the slaves and the version mismatch can be removed only by changing the software, the control device 700 (master) may downgrade the version of the one having the higher version between the control device 700 and the corresponding slave, only under predetermined conditions. To be more specific, the control device 700 may downgrade the version of the one having the lower version between the control device 700 and the corresponding slave, in the same manner as in the case of a version-up.

Also, when, for example, there is a version mismatch with part or all of the slaves and this version mismatch cannot be removed only by changing the software, the control device 700 (master) may send a signal to request a predetermined external device (for example, the managing device 2) to replace the one having the lower version between the control device 700 and the corresponding slave, with a device/unit of a higher version. In response to this request signal, the replacement device/unit is ordered, arrangements for a service person are made, and so forth, and, when the service person replaces the device/unit (hardware), the version mismatch can be automatically removed.

In this way, the control device 700 (master) can automatically remove a version mismatch between the control device 700 and a corresponding slave.

Note that the automatic mismatch removing process may be performed by the above-mentioned monitoring device/unit.

[Version Matching Between Injection Molding Machine and Managing Device]

Next, version matching between the injection molding machine 1 and the managing device 2 will be described with reference to FIG. 15 to FIG. 18.

As described above, data related to the control of an injection molding machine 1 might be exchanged between the injection molding machine 1 (slave) and the managing device 2 (master). Therefore, version matching (that is, whether or not there is a version mismatch) between the injection molding machine 1 and the managing device 2 may be monitored, as in the case of version matching between devices/units that exchange data with each other inside an injection molding machine 1.

Versions are specified for each of the injection molding machine 1 and the managing device 2.

The managing device 2 might send control data to the injection molding machine 1, and the injection molding machine 1 might receive the control data from the managing device 2. Also, the injection molding machine 1 might send operating status data to the managing device 2, and the managing device 2 might receive the operating status data from the injection molding machine 1. Therefore, it is necessary to ensure data compatibility between the sender and the receiver. In other words, the version of data needs to match between the sender and the receiver from the viewpoint of data compatibility. Therefore, with this example, table information (adaptable version table) related to the versions of the injection molding machine 1 (control device 700) that the managing device 2 can support from the viewpoint of data compatibility is defined. The range of versions for the injection molding machine 1 (control device 700) that the managing device 2 can support refers to a range in which the injection molding machine 1 (control device 700) can properly identify the elements of control data sent from the managing device 2, and in which the managing device 2 can output operating status data that the managing device 2 can properly identify.

For example, FIG. 15 is a diagram showing a first set of examples of specific elements of table information (adaptable version table) related to the versions of the injection molding machine 1 (control device 700) with which the managing device 2 can ensure data compatibility. To be more specific, FIG. 15 represents an adaptable version table for when the injection molding machine 1 and the managing device are in the initial state (for example, factory default).

As shown in FIG. 15, the adaptable version table includes a row that shows the current version of the managing device 2. Also, the adaptable version table includes, for example, rows that show the range of versions (the highest version and the lowest version) for the injection molding machine 1 (control device 700) that the current version of the managing device 2 can support from the viewpoint of data compatibility.

The adaptable version table is registered in advance with an internal memory such as a secondary memory device of the managing device 2 or the like. The managing device 2 updates the adaptable version table in accordance with the changes of the version of the managing device 2. This is because the range of versions for the injection molding machine 1 (control device 700) that the managing device 2 can support is uniquely determined for each version of the managing device 2.

As shown in FIG. 15, the current version of the managing device 2 is specified as "1.0," which corresponds to the initial state. Also, since the current versions for the injection molding machine 1 are also all "1.0," which corresponds to the initial state, the highest version and the lowest version for the injection molding machine 1 (control device 700) that the managing device 2 can support are also all specified as "1.0."

Here, the software of the managing device 2 might be revised within a range that does not influence the data compatibility with the injection molding machine 1, and thereupon the version of the managing device 2 might be upgraded. In this case, only the current versions for the managing device 2 in the adaptable version table are updated.

For example, FIG. 16 is a diagram showing a second set of examples of specific elements of the adaptable version table of the managing device 2. To be more specific, FIG. 6 shows an adaptable version table in which, from the state of the first set of examples (FIG. 15), described above, the version of the managing device 2 is upgraded from "1.0" to "1.1," within a range that does not influence the data compatibility with the injection molding machine 1 (control device 700).

In this example, based on FIG. 15, the adaptable version table is updated from the state in which the version of the managing device 2 is specified as "1.0," to the state in which it is specified as "1.1."

For example, when the version of the managing device 2 is upgraded in accordance with a predetermined input received from the user such as a worker or the administrator, the managing device 2 updates the adaptable version table in accordance with that predetermined input. Also, it is possible to employ a mode here in which an updated adaptable version table is delivered to the managing device 2 from an external device or the like that provides update data for upgrading the version of the managing device 2. Below, the same may apply to the case of updating to the adaptable version tables of FIG. 17 and FIG. 18.

Also, for example, FIG. 17 is a diagram showing a third set of examples of specific elements of the adaptable version table of the managing device 2. To be more specific, FIG. 17 shows an adaptable version table in which, from the state of the first set of examples (FIG. 15) described above, the version of the injection molding machine 1 (control device 700) can be upgraded from "1.0" to "1.1," within a range that does not influence the data compatibility with the managing device 2.

In this example, based on FIG. 15, the adaptable version table is updated from the state in which the highest version of the injection molding machine 1 (control device 700) that the managing device 2 can support from the viewpoint of data compatibility is specified as "1.0," to the state in which it is specified as "1.1."

Also, for example, FIG. 18 is a diagram showing a fourth set of examples of specific elements of the adaptable version table of the managing device 2. To be more specific, FIG. 18 shows a state of an adaptable version table in which the versions of the managing device 2 and the injection molding machine 1 are ready to be upgraded from "1.0" and "1.1" to "2.0," such that the format of data that is sent and received between the managing device 2 and the injection molding machine 1 and so forth is changed.

In this example, if the version of the managing device 2 is already upgraded, the adaptable version table is updated, based on one of FIG. 15 to FIG. 17, to a state in which the version of the managing device 2 is specified as "2.0." Also, in this example, based on one of FIG. 15 to FIG. 17, the adaptable version table is updated to a state in which the highest and lowest versions for the injection molding machine 1 (control device 700) that the managing device 2 can support from the viewpoint of data compatibility are both specified as "2.0."

Thus, according to this embodiment, the managing device 2 can use an adaptable version table. Therefore, the managing device 2 can determine (check) the version matching with the injection molding machine 1 (control device 700) from the viewpoint of the data compatibility of data that is exchanged (for example, control data, operation status data, etc.).

[Control Process Related to Version Matching Between Injection Molding Machine and Managing Device]

Next, a control process related to version matching between the injection molding machine 1 and the managing device 2 will be described.

The managing device 2 (master) may execute the same version matching control process as in FIG. 14, for example. To be more specific, the version matching control process may be executed upon the initial process (for example, activation) of the managing device 2, and upon the initial process (for example, activation) of a target injection molding machine 1 (control device 700) among a plurality of injection molding machines 1. Also, if there is a version mismatch with part or all of a plurality of injection molding machines 1, the managing device 2 may send a notification about the version mismatch to the user (for example, the administrator of the managing device 2) through a display device, a sound output device, and the like provided in the managing device 2. Also, the managing device 2 may send a notification about the version mismatch to the user (for example, the operator of the injection molding machine 1) via the display device 760 or the like of the target injection molding machine 1. Also, the managing device 2 may, for example, send a signal including a notification about the version mismatch to a user terminal (for example, a smartphone) through the communication network NW, thereby sending the notification about the version mismatch to the user through the user terminal. Also, if there is a version mismatch with part or all of the multiple injection molding machines 1, the managing device 2 may perform a process for automatically removing the version mismatch (automatic mismatch removing process), instead of or in addition to sending a notification about the version mismatch.

In this way, when there is a version mismatch between the managing device 2 (master) and an injection molding machine 1 (slave), the managing device 2 can send a notification about the version mismatch to the user. By this means, the managing device 2 can prompt the user to take measures to remove the version mismatch. Therefore, the management system SYS can prevent the situation where the compatibility of data exchanged between the managing device 2 (master) and the injection molding machine 1 (slave) is not ensured, and where, therefore, for example, the injection molding machine 1 malfunctions due to improper control based on such data.

Also, the managing device 2 can automatically remove a version mismatch between the managing device 2 (master) and the injection molding machine 1 (slave). By this means, the managing system SYS can directly prevent the situation where the compatibility of data exchanged between the managing device 2 (master) and the injection molding machine 1 (slave) is not ensured, and where, therefore, for example, the injection molding machine 1 malfunctions due to improper control based on such data.

Note that the version matching control process between the injection molding machine 1 and the managing device 2 may be performed by the injection molding machine 1 (control device 700). That is, instead of or in addition to performing the version matching process with the internal devices/units of the injection molding machine 1, the control device 700 of the injection molding machine 1 may perform the matching control process and the like, with an external device/unit of the injection molding machine 1 (managing device 2). Also, the version matching control process between the injection molding machine and the managing device 2 may be performed by a device apart from that injection molding machine 1 and the managing device 2 (for example, a server device for exclusive use for monitoring).

[Version Matching Between Master Machine and Slave Machine]

Next, version matching between an upper-level injection molding machine 1 (slave machine) and another injection molding machine 1 (slave machine) will be described with reference to FIG. 19 to FIG. 22.

As described above, the operation of an injection molding machine 1 (slave machine) might be controlled under the control of another, upper-level injection molding machine 1 (master machine) among a plurality of injection molding machines 1. In this case, data related to the control of the slave machine is exchanged between the master machine and the slave machine. Therefore, version matching (that is, whether or not there is a version mismatch) between the master machine and the slave machine may be monitored as in the case of version matching between the managing device 2 and an injection molding machine 1.

Versions are specified for each of a plurality of injection molding machines 1 (or their control devices 700).

The master machine might send control data to the slave machine, and the slave machine might receive control data from the master machine. Also, the slave machine might send operating status data to the master machine, and the master machine might receive the operating status data from the slave machine. Therefore, it is necessary to ensure data compatibility between the sender and the receiver. In other words, the version of data needs to match between the sender and the receiver from the viewpoint of data compatibility. Therefore, with this example, table information (adaptable version table) related to the versions of the slave machine (control device 700) that the master machine (control device 700) can support from the viewpoint of data compatibility is defined. The range of versions for the slave machine (control device 700) that the master machine can support refers to a range in which the slave machine (control device 700) can properly identify the elements of control data sent from the master machine, and in which the slave machine (control device 700) can output operating status data that the master machine can properly identify.

For example, FIG. 19 is a diagram showing a first set of examples of specific elements of table information (adaptable version table) related to the versions of the slave machine (control device 700) with which the master machine (control device 700) can ensure data compatibility. To be more specific, FIG. 19 shows an adaptable version table for when the master machine and the slave machine are in the initial state (for example, factory default state).

As shown in FIG. 19, the adaptable version table includes, for example, a row that shows the current version of the master machine (control device 700). Also, the adaptable version table includes, for example, rows that show the range of versions (the highest version and the lowest version) for the slave machine (control device 700) that the current version of the master machine can support from the viewpoint of data compatibility.

The adaptable version table is registered in advance with an internal memory such as the secondary memory device 703 of the control device 700 of the master machine. The master machine (control device 700) updates the adaptable version table in accordance with the changes of the version of the master machine. This is because the range of versions for the slave machine (control device 700) that the master machine (control device 700) can support is uniquely determined for each version of the master machine (control device 700).

As shown in FIG. 19, the current version of the master machine (control device 700) is specified as "1.0," which corresponds to the initial state. Also, since the current versions for the slave machine (control device 700) are also all "1.0," which corresponds to the initial state, the highest version and the lowest version for the slave machine (control device 700) that the master machine (control device 700) can support are also all specified as "1.0."

Here, a case might occur in which the software of a plurality of injection molding machines 1 (control devices 700) is revised, within a range that does not influence the data compatibility between the slave machine and the master machine, and thereupon the versions of the injection molding machines 1 (control devices 700) are upgraded.

For example, FIG. 20 and FIG. 21 are diagrams showing second and third example sets of specific elements of the adaptable version table of the master machine. To be more specific, FIG. 20 and FIG. 21 each show an adaptable version table in which, from the state of the first set of examples (FIG. 19) described above, the versions of the master machine and the slave machine can be upgraded from "1.0" to "1.1."

In this example, based on FIG. 19, the adaptable version table is updated from the state in which the highest version of the slave machine (control device 700) that the master machine (control device 700) can support from the viewpoint of data compatibility is specified as "1.0," to the state in which it is specified as "1.1."

Also, in this example, if the version of the master machine is already upgraded, as shown in FIG. 20, the compatible version table is updated to a state in which the version of the master machine (control device 700) is specified as "1.1." On the other hand, if the version of the master machine is not yet upgraded, the version of the master machine (control device 700) in the adaptable version-up table is maintained at "1.0," as shown in FIG. 21.

Also, for example, FIG. 22 is a diagram showing a fourth set of examples of specific elements of the adaptable version table of the master machine. To be more specific, FIG. 22 shows a state of an adaptable version table in which the versions of the master machine and the slave machine are ready to be upgraded from "1.0" or "1.1" to "2.0," so that, for example, the format of data sent and received between the master machine and the slave machine changes.

In this example, the version of the master machine is already upgraded, and, based on any one of FIG. 19 to FIG. 21, the adaptable version table is updated to a state in which the version of the master machine (control device 700) is specified as "2.0." Also, in this example, the adaptable version table is updated, based on one of FIG. 19 to FIG. 21, to a state in which the highest and lowest versions for the slave device (control device 700) that the master machine 700 (control device 700) can support from the viewpoint of data compatibility are both specified as "2.0."

As described above, in this embodiment, the master machine (control device 700) can use an adaptable version table. Therefore, the master machine (control device 700) can determine (check) the version matching with the slave machine (control device 700) from the viewpoint of the data compatibility of data that is exchanged (for example, control data, operation status data, etc.).

[Control process related to version matching between master machine and slave machine] Next, a control process related to version matching between an upper-level injection molding machine 1 (master machine) and a lower-level injection molding machine (slave machine) will be described.

The master machine may execute the same version matching control process as in FIG. 14, for example. To be more specific, the version matching control process may be executed upon the initial process (for example, activation) of at least one of the master machine and the slave machine. Also, if there is a version mismatch with part or all of a plurality of slave machines, the master machine may send a notification about the version mismatch to the user through the master machine's display device 760, the slave machine's display device 760, or the like. Also, the master machine may, for example, send a signal including a notification about the version mismatch to a user terminal (for example, a smartphone) through the communication network NW, thereby sending a notification about the version mismatch to the user through the user terminal. Also, if there is a version mismatch between part or all of the multiple slave machines, the master machine may perform a process for automatically removing the version mismatch (automatic mismatch removing process), instead of or in addition to sending a notification about the version mismatch.

In this way, when there is a version mismatch between a master machine and a slave machine, the master machine can send a notification about the version mismatch to the user. By this means, the master machine can prompt the user to take measures to remove the version mismatch. Therefore, the management system SYS can prevent the situation where the compatibility of data exchanged between the master machine and the slave machine is not ensured, and where, therefore, for example, the slave machine malfunctions due to improper control based on such data.

Also, the master machine can automatically remove a version mismatch between the master machine and the slave machine. By this means, the managing system SYS can directly prevent the situation where the compatibility of data exchanged between the master machine and the slave machine is not ensured, and where, therefore, for example, the slave machine malfunctions due to improper control based on such data.

Note that the version matching control process between the master machine and the slave machine may be performed by a device apart from the master machine and the slave machine (for example, a managing device 2, a server device for exclusive use for monitoring, etc.).

[Effects]

Next, the effects of the managing system SYS, the injection molding machine 1, and so forth according to this embodiment will be described.

In this embodiment, the injection molding machine 1 (an example of the first injection molding machine) may be communicably connected with the managing device 2 (an example of a predetermined device), and do at least one of the following: send data to the managing device 2; and receive data from the managing device 2. Then, if there is a version mismatch between the managing device 2 and the injection molding machine 1, the managing system SYS may do at least one of the following: send a notification about the version mismatch to the user; and perform a process for removing the version mismatch.

Similarly, a slave machine (an example of the first injection molding machine) may be communicably connected with a master machine (a predetermined device, and an example of a second injection molding machine), and do at least one of the following: send data to the master machine; and receive data from the master machine. Then, if there is a version mismatch between the master machine and the slave machine, the managing system SYS may do at least one of the following: send a notification about the version mismatch to the user; and perform a process for removing the version mismatch.

For example, when there is a version mismatch, there is a possibility that the compatibility of data exchanged between the managing device 2 or the master machine and the injection molding machine 1 that is under control is not ensured, and that the control, diagnosis, and so forth related to the injection molding machine 1 cannot be carried out properly based on the data exchanged. As a result of this, for example, the injection molding machine 1 might operate in a way that the user does not expect.

In contrast with the above, according to this embodiment, the managing system SYS can prompt the user to remove the version mismatch between the managing device 2 or the master machine and the injection molding machine 1 that is under control, or remove the version mismatch automatically. Therefore, the managing system SYS can allow the injection molding machine 1 that is under control, to operate more properly.

Also, according to this embodiment, the managing system SYS may determine whether or not there is a version mismatch between the managing device 2 and the injection molding machine 1, upon activation of at least one of the managing device 2 and the injection molding machine 1.

Similarly, the managing system SYS may determine whether or not there is a version mismatch between the master machine and the slave machine, upon activation of at least one of the master machine and the slave machine.

For example, if a defect is found in one of the managing device 2 or the master machine and the injection molding machine 1 that is under control, an update fails, and so forth, a version mismatch is more likely to occur upon the next activation.

On the other hand, the managing system SYS can determine whether or not there is a version mismatch, upon activation of the controlling end (the managing device 2, the master machine, etc.) or the controlled end (the injection molding machine 1). Therefore, the managing system SYS can find a version mismatch between the managing device 2 or the master machine and the injection molding machine 1 that is under control, at an earlier timing.

Also, according to this embodiment, an injection molding machine 1 may report information about the version of the injection molding machine 1 (itself) to the managing device 2. Then, the managing device may determine whether or not there is a version mismatch between the managing device 2 and the injection molding machine 1 based on the version-related information reported from the injection molding machine 1.

Similarly, a slave machine may report information about the version of the slave machine (itself) to the master machine. Then, the master machine may determine whether or not there is a version mismatch between the master machine and the slave machine based on the version-related information reported from the slave machine.

By this means, the controlling end (the managing device 2, the master machine, etc.) in the managing system SYS can determine a version mismatch with the controlled end.

Also, according to this embodiment, the managing device 2 may determine whether or not there is a version mismatch between the managing device 2 and an injection molding machine 1 based on information representing the range of versions for the injection molding machine 1 that match with the versions of the managing device 2.

Similarly, a master machine may determine whether or not there is a version mismatch between the master machine and a slave machine based on information representing the range of the slave machine's versions that match with the master machine's versions.

By this means, the managing system SYS can more easily determine whether or not there is a version mismatch between the managing device 2 or the master machine and the injection molding machine 1 that is under control.

Also, according to this embodiment, an injection molding machine 1 may do at least one of the following: receive data related to the control of the injection molding machine 1 from the managing device 2; and send the data acquired in the injection molding machine 1 to the managing device 2. Then, if there is a version mismatch between the managing device 2 and the injection molding machine 1, the managing system SYS may limit the operation of the injection molding machine 1.

Similarly, the slave machine may do at least one of the following: receive data related to the control of the slave machine from the master machine; and send the data acquired in the slave machine to the master machine. Then, the managing system SYS may limit the operation of the slave machine when there is a version mismatch between the master machine and the slave machine.

By this means, if the situation arises where there is a version mismatch and the injection molding machine 1 that is under control may be unable to operate properly, the managing system SYS can limit its operation. Therefore, the managing system SYS can improve the safety of the injection molding machine 1.

According to this embodiment, if there is a version mismatch between a managing device 2 and an injection molding machine 1, the managing system SYS may upgrade the version of at least one of the managing device 2 and the injection molding machine 1.

Similarly, if there is a version mismatch between a master machine and a slave machine, the managing system SYS may upgrade the version of at least one of the master machine and the slave machine.

By this means, the managing system SYS can, for example, upgrade the one showing the lower version between the controlling end (the managing device 2 or the master machine) and the controlled end (the injection molding machine 1), and remove the version mismatch.

In this embodiment, when a failure to upgrade the version of one of a managing device 2 and an injection molding machine 1 results in a version mismatch between the managing device 2 and the injection molding machine 1, the managing system SYS may downgrade the version of the other one of the managing device 2 and the injection molding machine 1.

Similarly, if a failure to upgrade the version of one of a master machine and a slave machine results in a version mismatch between the master machine and the slave machine, the managing system SYS may downgrade the version of the other one of the master machine and the slave machine.

For example, if a version-up fails, there may be a problem with the update data. Therefore, even if the version-up is retried using the same update data, the version-up might fail again, and the version mismatch might not be removed.

By contrast with this, according to this embodiment, the managing system SYS can downgrade the one having the higher version between the controlling end (the managing device 2 and the master machine) and the controlled end (the injection molding machine 1), and thus remove the version mismatch.

Also, according to this embodiment, the driver 710 (an example of a second device and a driving device), the encoder 720 (an example of a second device and a sensor), and so forth are communicably connected with the control device 700 (an example of the first device), and do at least one of the following: send data to the control device 700; and receive data from the control device 700. Then, if there is a version mismatch between the control device 700 and the driver 710 or the encoder 720, the injection molding machine 1 may do at least one of the following: send a notification about the version mismatch to the user; and perform a process for removing the version mismatch.

For example, if there is a version mismatch, there is a possibility that the compatibility of data exchanged between the control device 700 and the driver 710 or the encoder 720 is not ensured, and the control, diagnosis, and so forth related to the injection molding machine 1 cannot be performed properly based on the exchanged data. As a result of this, for example, the injection molding machine 1 might operate in a way that the user does not expect.

Also, for example, when a plurality of injection molding machines 1 are provided, a version-up might fail in some of the injection molding machines 1 and incur a version mismatch. As a result of this, the quality of manufactured molded products might vary between injection molding machines 1 not having a version mismatch and injection molding machines 1 having a version mismatch.

In contrast to this, according to this embodiment, an injection molding machine 1 can prompt the user to remove the version mismatch between the control device 700 and the driver 710 or the encoder 720, or remove the version mismatch automatically. Therefore, the injection molding machine 1 can allow the injection molding machine 1 (itself) to operate more properly. Therefore, the injection molding machine 1 can, for example, prevent an occurrence of unexpected operations or problems of unknown cause, and, as a consequence of that, reduce the decrease in productivity, while ensuring safety. Also, a managing system SYS accommodating a plurality of injection molding machines 1 can prevent the quality of molded products from varying between the injection molding machines 1.

Also, according to this embodiment, whether or not there is a version mismatch between the control device 700 and the driver 710 or the encoder 720 may be determined upon activation of the injection molding machine 1.

For example, if a failure occurs with one of the control device 700 and the driver 710 or the encoder 720, an update fails, and so on, a version mismatch might occur upon the next activation.

On the other hand, the injection molding machine 1 can determine, upon its activation, whether or not there is a version mismatch. Therefore, the injection molding machine 1 can detect a version mismatch between the control device 700 and the driver 710 or the encoder 720 at an earlier timing.

Also, according to this embodiment, the driver 710 or the encoder 720 might report information about the version of the driver 710 or the encoder 720, to the control device 700. Then, the control device 700 may determine whether or not there is a version mismatch between the control device 700 and the driver 710 or the encoder 720 based on the version-related information reported from the driver 710 or the encoder 720.

By this means, with the injection molding machine 1, the control device 700 of the controlling (upper-level) end can determine a version mismatch with the driver 710 or the encoder 720 of the controlled (lower-level) end.

Also, according to this embodiment, the control device 700 may determine whether or not there is a version mismatch between the control device 700 and the driver 710 or the encoder 720, based on information (adaptable version table) representing the range of versions for the driver 710 and the encoder 720 that match with the versions of the control device 700.

By this means, the injection molding machine 1 can more easily determine whether or not there is a version mismatch.

Also, according to this embodiment, an electric actuator (an example of a third device) is controlled based on data exchanged between the control device 700 and the driver 710 or the encoder 720. Then, when there is a version mismatch between the control device 700 and the driver 710 or the encoder 720, the injection molding machine 1 may limit the operation of the electric actuator.

By this means, given the situation in which the compatibility of data cannot be ensured between the control device 700 and the driver or the encoder 720 due to a version mismatch, the injection molding machine 1 can limit the operation of the electric actuator that is controlled based on data exchanged between the control device 700 and the driver or the encoder 720. Therefore, the injection molding machine 1 can improve the safety.

Also, according to this embodiment, if there is a version mismatch between the control device 700 and the driver 710 or the encoder 720, the injection molding machine 1 may upgrade the version of at least one of the control device 700 and the driver 710 or the encoder 720. Also, if there is a version mismatch between the control device 700 and the driver 710 or the encoder 720, the injection molding machine 1 may send, to the user, a notification that prompts the user to upgrade the version of at least one of the control device 700 and the driver 710 or the encoder 720.

By this means, the injection molding machine 1 can, for example, upgrade the version of the one showing the lower version between the control device 700 and the driver 710 or the encoder 720, and thus remove the version mismatch. Therefore, the injection molding machine 1 can minimize the decrease in productivity.

Also, according to this embodiment, if a failure to upgrade the version of one of the control device 700 and the driver 710 or the encoder 720 results in a version mismatch between the control device 700 and the driver 710 or the encoder 720, the injection molding machine 1 may downgrade the version of the other one of the control device 700 and the driver 710 or the encoder 720. Also, if a failure to upgrade the version of one of the control device 700 and the driver 710 or the encoder 720 results in a version mismatch between the control device 700 and the driver 710 or the encoder 720, the injection molding machine 1 may send, to the user, a notification to prompt the user to downgrade the version of the other one of the control device 700 and the driver 710 or the encoder 720.

For example, if a version-up fails, there may be a problem with the update data. Therefore, even if the version-up is retried using the same update data, the version-up might fail again, and the version mismatch might not be removed.

In contrast with this, according to this embodiment, the injection molding machine 1 can downgrade the one having the higher version between the control device 700 and the driver 710 or the encoder 720, and thus remove the version mismatch.

[Changes and Modifications]

Although an embodiment has been described in detail above, the present disclosure is by no means limited to this specific embodiment, and various modifications and changes can be made within the scope of the present disclosure recited in the claims. The modifications and changes may include combinations of elements of the above-described embodiment.

For example, in the above-described embodiment, information about the current versions of a plurality of devices/units that exchange data with each other in the injection molding machine 1, information related to version matching, and so forth may be reported to the user, in a visual way, in response to a request from the user. The information related to version matching is, for example, adaptable version table information and the like. To be more specific, the control device 700 may display information about the current versions of a master device/unit and a slave device/unit, information about the version matching between the master device/unit and the slave device/unit, and so forth, on the display device 760, in response to a predetermined input from the user through the operating device 750. By this means, the user can check the current versions of internal devices/units of the injection molding machine 1, check the matching of versions between internal devices/units, and so forth, at any unspecified timing. Also, the managing device 2 may display information about the current versions of a master device/unit and a slave device/unit, information about version matching between the master device/unit and the slave device/unit, and so forth, on the display unit, for each of a plurality of injection molding machines 1, in response to a predetermined input from the user. In this case, for example, a plurality of injection molding machines 1 may each send information about the current version of master devices/units and slave devices/units, information about version matching between the master devices/units and the slave devices/units, and so forth, to the managing device 2, in response to a request from the managing device 2, or periodically. By this means, the user can check, at any unspecified timing, the matching of current versions between internal devices/units of the injection molding machines 1, the matching of versions between internal devices/units, and so forth, for each of a plurality of injection molding machines 1.

Also, in the above-described embodiment and the like, information about the current versions of the managing device 2 and an injection molding machine 1, information about the version matching between the managing device 2 and the injection molding machine 1, and so forth may be reported to the user in a visual way, in response to a request from the user. To be more specific, an injection molding machine 1 (control device 700) may display information about the current versions of the managing device 2 and the injection molding machine 1 (control device 700), information about the version matching between the managing device 2 and the injection molding machine (control device 700), and so forth, on the display device 760, in response to a predetermined input that is input from the user through the operating device 750. By this means, the user can check the current versions of the managing device 2 and the injection molding machine 1 (control device 700), version matching between the managing device 2 and the injection molding machine 1 (control device 700), and so forth, at any unspecified timing. Also, the managing device 2 displays information about the current versions of the managing device 2 and the injection molding machine 1, information about the version matching between the managing device 2 and the injection molding machine 1, and so forth, on the display unit, for each of a plurality of injection molding machines 1, in response to a predetermined input from the user. In this case, for example, a plurality of injection molding machines 1 each send information about the current version of the injection molding machine 1 (control device 700), to the managing device 2, in response to a request from the managing device 2, or periodically. By this means, the user can check the current versions of the managing device 2 and the injection molding machine (control device 700), the version matching between the managing device 2 and the injection molding machine 1 (control device 700), and so forth, at any unspecified timing, for each of the plurality of injection molding machines 1.

Also, in the above-described embodiment and the like, information about the current versions of a master machine and a slave machine, information related to the version matching between the master machine and the slave machine, and so forth may be reported to the user, in a visual way, in response to a request from the user. To be more specific, the master machine (control device 700) may display information about the current versions of the master machine and the slave machine, information about version matching between the master machine and the slave machine, and so forth, on the display device 760, for each slave machine, in response to a predetermined input that is input from the user through the operating device 750. Also, the slave machine (control device 700) sends information about the current version of the master machine and the slave machine and information about version matching between the master machine and the slave machine to the display device 760 in response to a predetermined input from the user through the operating device 750. In this case, the master machine (control device 700) sends information about the version of the master machine to the slave machine, in response to a request from the slave machine, or periodically. Also, the managing device 2 displays information about the current versions of the master machine and the slave machine, information about the version matching between the master machine and the slave machine, and so forth, on its display unit, for each master machine and for each slave machine, in response to a predetermined input from the user. By this means, the user can check the current version of the master machine and the slave machine, version matching between the master machine and the slave machine, and so forth, at any unspecified timing.

Also, for example, the above-described embodiment has been illustrated in association with an injection molding machine 1 and has described a method of removing a version mismatch from the perspective of data compatibility between internal devices/units or with external devices/units, and the same method may be applied to any unspecified machines (for example, other industrial machines) or devices (for example, home appliances). Such other industrial machines include stationary machines installed in factories, such as machine tools and production robots. Also, other industrial machines include, for example, mobile work machines. Such mobile work machines include, for example, construction machines such as excavators and bulldozers, agricultural machines such as combines, transport machines such as mobile cranes, and so forth.

It should be understood that the invention is not limited to the above-described embodiment, but may be modified into various forms on the basis of the spirit of the invention. Additionally, the modifications are included in the scope of the invention.

The invention claimed is:

1. An injection molding machine comprising:
a first device;
a second device that is communicably connected with the first device and configured to perform at least one of the following:
send data to the first device; and
receive data from the first device; and
a third device configured to be driven by the second device,
wherein, when there is a version mismatch between the first device and the second device, the injection molding machine performs at least one of the following:
send a notification about the version mismatch to a user; and
perform a process for removing the version mismatch,
wherein the second device is configured to receive data about control of the second device from the first device such that operation of the second device is controlled by the first device based on the received data,
wherein the first device is configured to limit an operation of the third device when there is the version mismatch between the first device and the second device, and
wherein limiting the operation of the third device includes causing the third device to operate more slowly than in normal times.

2. The injection molding machine according to claim 1, wherein the version mismatch between the first device and the second device indicates one of:
a state in which the data is not compatible between the first device and the second device; and
a state in which a possibility exists of the data not being compatible between the first device and the second device.

3. The injection molding machine according to claim 1, wherein the injection molding machine is configured to send the notification about the version mismatch to the user in response to determining that there is the version mismatch, the notification including a notification about a proper version for one of the first device and the second device for removing the version mismatch.

4. The injection molding machine according to claim 1, wherein the injection molding machine is configured to determine whether there is the version mismatch upon activation of the injection molding machine.

5. The injection molding machine according to claim 1, wherein
the second device is configured to report information about a version of the second device to the first device, and
the first device is configured to determine whether there is the version mismatch based on the information about the version of the second device reported from the second device.

6. The injection molding machine according to claim 1, wherein the injection molding machine is configured to determine whether there is the version mismatch based on information representing a range of versions for the second device that match with a version of the first device.

7. The injection molding machine according to claim 1, wherein the injection molding machine is configured to upgrade a version of at least one of the first device and the second device or send a notification to prompt the user to upgrade a version of at least one of the first device and the second device.

8. The injection molding machine according to claim 1, wherein the injection molding machine is configured to, when the version mismatch is caused by a failure in upgrading a version of one of the first device and the second device, downgrade a version of the other one of the first device and the second device.

9. The injection molding machine according to claim 1, wherein
the third device is an actuator configured to operate the injection molding machine,
the first device is a control device that is configured to control the actuator based on the data, and
the second device is a drive device that is configured to drive the actuator, or a sensor that is configured to acquire detection data related to an operation of the actuator.

* * * * *